(12) United States Patent
Irwin

(10) Patent No.: US 8,052,177 B2
(45) Date of Patent: Nov. 8, 2011

(54) PIPE COUPLING

(76) Inventor: William James Irwin, Dungiven (GB)

( * ) Notice: Subject to any disclaimer, the term of this patent is extended or adjusted under 35 U.S.C. 154(b) by 584 days.

(21) Appl. No.: 11/995,084

(22) PCT Filed: Jul. 10, 2006

(86) PCT No.: PCT/EP2006/006759
§ 371 (c)(1),
(2), (4) Date: May 23, 2008

(87) PCT Pub. No.: WO2007/006542
PCT Pub. Date: Jan. 18, 2007

(65) Prior Publication Data
US 2009/0174181 A1 Jul. 9, 2009

(30) Foreign Application Priority Data
Jul. 8, 2005 (GB) ................................. 0513995.1

(51) Int. Cl.
*F16L 21/00* (2006.01)
(52) U.S. Cl. ........ 285/377; 285/314; 285/340; 285/343; 285/402; 285/45
(58) Field of Classification Search .................. 285/314, 285/313, 308, 340, 343, 377, 402, 45
See application file for complete search history.

(56) References Cited

U.S. PATENT DOCUMENTS

| | | | | |
|---|---|---|---|---|
| 2,394,351 A | * | 2/1946 | Wurzburger | 285/341 |
| 4,586,734 A | * | 5/1986 | Grenier | 285/340 |
| 4,810,009 A | * | 3/1989 | Legris | 285/340 |
| 4,822,082 A | * | 4/1989 | Phillipps | 285/348 |
| 5,348,354 A | * | 9/1994 | Badoureaux | 285/308 |
| 5,437,483 A | * | 8/1995 | Umezawa | 285/308 |
| 6,145,887 A | * | 11/2000 | Cambot-Courrau | 285/340 |
| 6,581,907 B1 | * | 6/2003 | Kuwabara et al. | 285/314 |
| 7,063,359 B2 | * | 6/2006 | Vallee | 285/308 |

(Continued)

FOREIGN PATENT DOCUMENTS
EP 0379655 A2 8/1990
(Continued)

OTHER PUBLICATIONS

International Search Report issued by European Patent Office on Nov. 29, 2006 regarding International Application No. PCT/EP2006/006759.

(Continued)

*Primary Examiner* — David E Bochna
(74) *Attorney, Agent, or Firm* — Verrill Dana, LLP; Chris A. Caseiro

(57) ABSTRACT

A pipe coupling (1) comprising a tubular body (2) having at least one open end (3,4,5), a stop component (14) disposed within the tubular body distal to the open end to stop a pipe when it is inserted a predetermined distance into the tubular body. A sealing component (15) is intermediate the stop and the open end and a pipe engaging component (17) is disposed intermediate the sealing component and the open end having a variable diameter to clamp and release an inserted pipe as a result of the diameter of the pipe engaging component reducing and increasing respectively. A pipe release component (21) is disposed intermediate the pipe engaging component and the open end, the pipe release component being movably mounted on the open end and having a pipe clamping position.

51 Claims, 16 Drawing Sheets

U.S. PATENT DOCUMENTS

| | | | | |
|---|---|---|---|---|
| 7,445,247 B2 * | 11/2008 | Ericksen et al. | | 285/308 |
| 7,445,250 B2 * | 11/2008 | Swift et al. | | 285/308 |
| 7,806,443 B1 * | 10/2010 | Plattner | | 285/342 |

FOREIGN PATENT DOCUMENTS

| | | | |
|---|---|---|---|
| EP | 0933579 | A2 | 8/1999 |
| EP | 1219883 | A2 | 7/2002 |
| GB | 2196403 | A | 4/1988 |

OTHER PUBLICATIONS

International Preliminary Report on Patentability issued by European Patent Office on Aug. 17, 2007 regarding International Application No. PCT/EP2006/006759.

* cited by examiner

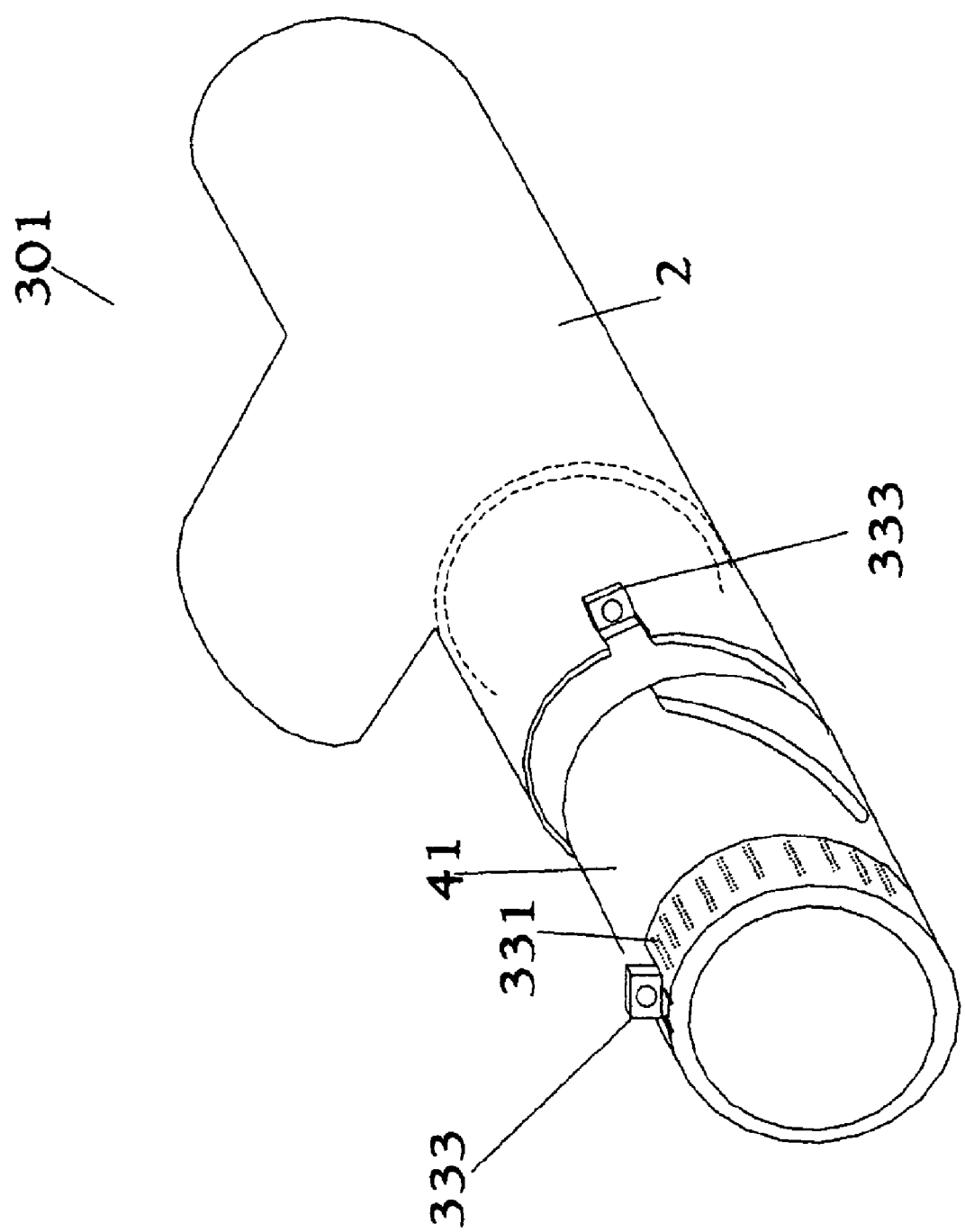

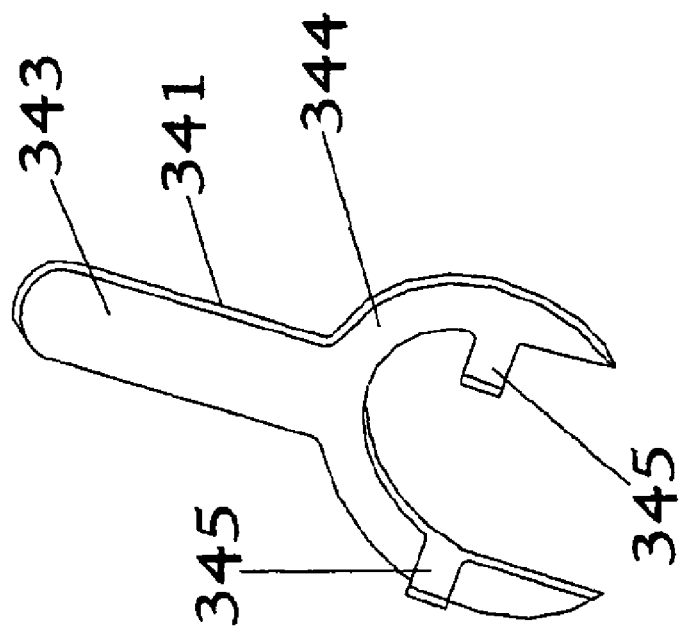
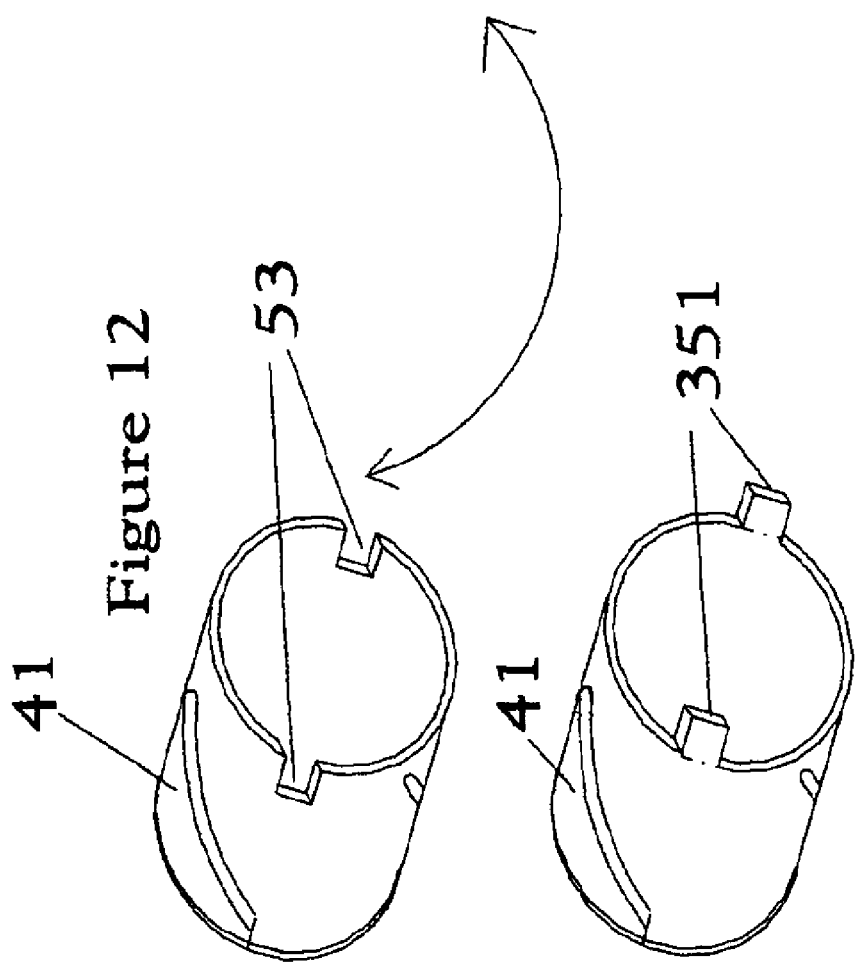

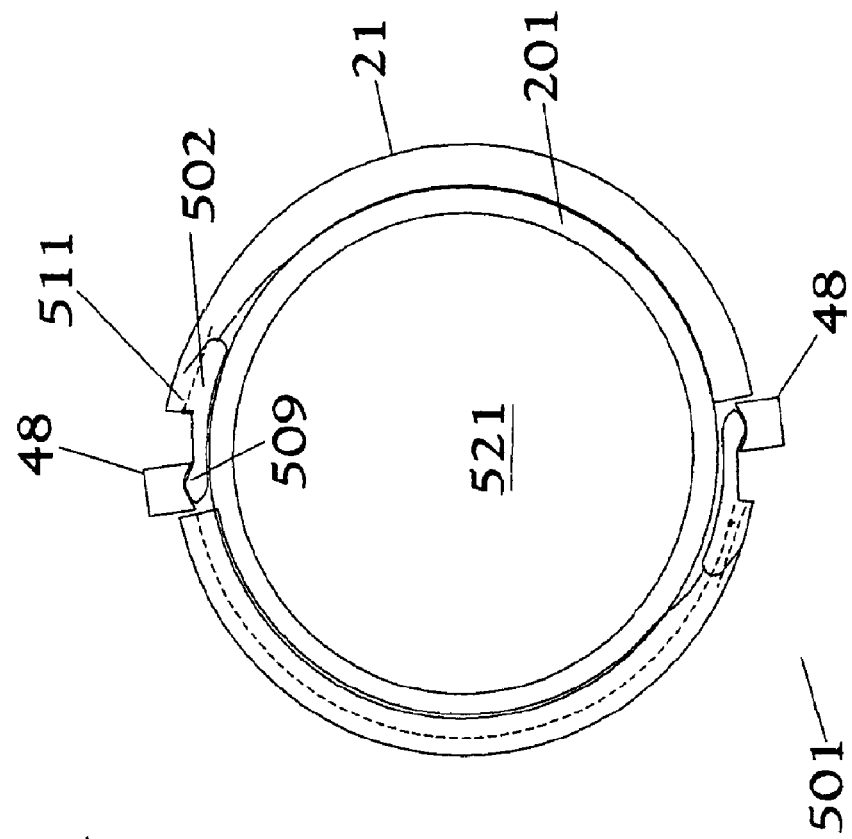
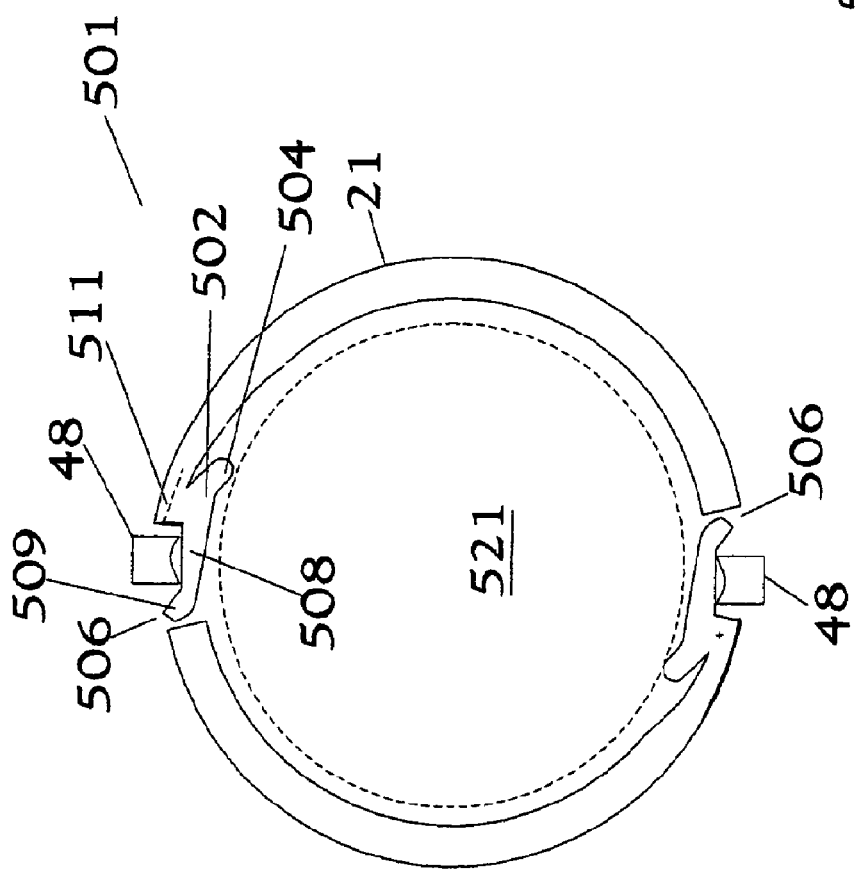

PIPE COUPLING

CROSS REFERENCE TO RELATED APPLICATIONS

This application is a National Stage application of PCT/EP2006/006759, filed Jul. 10, 2006, which claims priority from Great Britain patent application 0513995.1, filed Jul. 8, 2005.

BACKGROUND OF THE INVENTION

1. Field of the Invention

The present invention relates to a pipe coupling and in particular to a pipe coupling for connecting to at least one pipe in a fluid tight manner.

2. Description of Prior Art

Traditionally, copper pipes have been joined by plumbers who clean the insides of pipe fittings and the ends of the pipes to be inserted into the pipe fittings with wire wool. Flux is then applied to the inside of the pipe fitting with a brush and the clean end of the pipe is pushed inside the pipe fitting. Some of the fittings already have solder inside although it is recommended to add extra solder. The plumber heats a piece of solder wire off a coil with a burner and locates the heated solder against the joint of the pipe and the pipe fitting. Capillary action draws the solder into the joint and seals the joint. In recent times, a variety of push-fit solder free fittings have been produced for both plastic and copper pipes in order to reduce the time required to install plumbing fixtures and fittings.

SUMMARY OF THE INVENTION

It is an object of the present invention to provide an alternative form of solder free pipe coupling.

Accordingly, the present invention provides a pipe coupling comprising a tubular body having at least one open end, stop means disposed within the tubular body distal to the open end to stop a pipe when it is inserted a predetermined distance into the tubular body, sealing means intermediate the stop means and the open end and a pipe engaging means disposed intermediate the sealing means and the open end having a variable diameter to clamp and release an inserted pipe as a result of the diameter of the pipe engaging means reducing and increasing respectively and a pipe release means disposed intermediate the pipe engaging means and the open end, the pipe release means being movably mounted on the open end, the pipe release means having a pipe clamping position where the pipe release means is out of contact with the pipe engaging means which is in a pipe clamping position and a pipe release position where the pipe release means is in contact with the pipe clamping means which is in a pipe releasing position, the pipe release means being movable between these two positions by an operator.

Advantageously, this configuration allows any pipe connected to the coupling to be demounted and remounted when required.

Preferably, in a first embodiment the pipe coupling has only one open end. Advantageously, this embodiment is used as a pipe end stop.

In a second embodiment and a third embodiment the pipe coupling has two and three open ends respectively. In these embodiments, the pipe coupling is used for connecting at least two pipes in a fluid tight manner.

Ideally a portion of the tubular body proximal to the open end has an internal diameter tapering towards the open end.

In a fourth embodiment of pipe coupling, the tubular body has a constant cross sectional diameter along its length.

In the fourth embodiment, the pipe release means engages the pipe clamping means and lifts the pipe clamping means out of contact with the pipe when the pipe release means is moved from the pipe clamping position to the pipe releasing position.

In the fourth embodiment, the pipe clamping means is a clamping o-ring having a plurality of substantially radially inwardly projecting teeth.

In the fourth embodiment, all of the teeth extend in the same direction away from a plane perpendicular to the longitudinal axis of the tubular body.

In the fourth embodiment, the teeth are angled away from the open end toward the stop in use. Advantageously, this facilitates smooth insertion of a pipe.

In the fourth embodiment, an abutment on the internal surface of the tubular body prevents the clamping o-ring moving in a direction towards the stop means.

In a fifth embodiment, the at least one open end is a converging end to define a reduced diameter opening relative to the tubular body's diameter.

In the fifth embodiment, an annular insert having an inner diameter surface tapering towards the open end is fixed proximal to the open end of a constant internal diameter tubular body.

In the fifth embodiment, the converging end is provided by a converging tubular body.

In the fifth embodiment, the diameter of the pipe engaging means reduces and increases due to translation along the tubular body toward and away from the converging end respectively.

Preferably, the tubular body of the pipe coupling is manufactured from any one of copper, stainless steel and brass.

Alternatively, the tubular body of the pipe coupling is manufactured from plastic.

In the fifth embodiment, the pipe engaging means is a split grab ring.

Preferably, the split grab ring is in co-axial alignment with the pipe release means.

Ideally, the surface of the split grab ring inner edge is selected from any one of plain, toothed or serrated.

Preferably, the split grab ring is manufactured from stainless steel, hardened brass, plastic or any other suitable rigid material.

Alternatively, the split grab ring is manufactured from plastic with steel, brass or metal inserts.

Ideally, the pipe release means comprises a releaser collar having means for moving the releaser collar relative to the open end.

Preferably, the moving means is at least one spiral slot extending longitudinally along a wall of the releaser collar.

Ideally, the surface of the slot is uneven. Preferably, the surface of the slot has a ridge and groove contour.

Preferably, the releaser collar is in coaxial alignment with the pipe clamping means.

Ideally, the internal surface of the open end of the tubular body has moving means for cooperating with the moving means of the releaser collar to achieve movement between the releaser collar and the tubular body.

Ideally, the moving means on the internal surface of the open end of the tubular body is at least one protuberance projecting radially inwardly for operable engagement with the at least one spiral slot of the releaser collar.

Ideally, the releaser collar has two spiral slots and the internal surface of the open end has two protuberances projecting radially inwardly for operable engagement with the two spiral slots.

Preferably, an end face of the releaser collar adjacent the open end of the tubular body has means for engaging a tool.

Ideally, the tool engaging means of the releaser collar comprises a pair of diametrically opposed tool engaging slots.

Optionally, the tool engaging means comprises a pair of lugs integrally formed with the releaser collar projecting beyond the end face of the converging end.

Ideally, a tool is provided for engaging the tool engaging means of the releaser collar.

Preferably, the tool has a handle and an open ended annular ring with a pair of tabs protruding orthogonally out of the main plane of the tool for engaging the slots of the releaser collar.

Ideally, barrier means are provided on the pipe coupling to prevent a pipe being inserted when the sealing means is exposed.

Ideally, a lever arrangement having a lever member is movably mounted on the pipe release means at or about the end of at least one spiral slot.

Preferably, the longitudinal axis of the lever member is substantially in alignment with the portion of the spiral slot adjacent to the lever member.

Ideally, the lever member is pivotally mounted about one end of the at least one spiral slot.

Preferably, a protruding end of the lever member protrudes into the internal space defined by the pipe release means. Advantageously, this prevents a pipe being inserted into the pipe coupling beyond the protruding end of the lever member.

Ideally, an actuating member of the lever member on the opposite side of the pivotal connection to the protruding end has a ramp. Advantageously, as the releaser collar is rotated clockwise the protuberances mount the ramps which pivots the protruding end of the lever member out of the internal space defined by the releaser collar allowing a pipe to be inserted.

Preferably, a groove is formed on the surface of the actuating member into which the protuberances drop and the face of the groove opposing the ramp has a step. Advantageously, the step locks the protuberance in position preventing anti-clockwise rotation of the releaser collar until pivotal motion of the lever member causes the step to be moved radially inwards a sufficient distance to allow the protuberances to pass allowing the pipe release means to be rotated anticlockwise.

The effect of this lever arrangement is to prevent a pipe being inserted until the pipe release means is rotated substantially fully into the tubular body to cover the sealing member. This prevents the integrity of the seal being compromised by burrs or other discrepancies on the end of the pipe. Furthermore, as a result of the step it is only possible to rotate the pipe release member out of the tubular body into a pipe clamping position when the pipe has been inserted to maintain the protruding end of the lever arrangement in alignment with the internal circumference of the releaser collar which also maintains the step in the radially inward position.

In the event that the pipe release means is in a pipe clamping position without the pipe inserted into the pipe coupling, then a reset blank (not shown) is required to be inserted into the tubular body to support the inner wall of a guard means before returning it to the pipe release position. This reset blank will contact the sealing member therefore it has a leading edge free from burrs and has flats or grooves to bypass the protruding ends of the lever members and is manufactured from a non abrasive or plastic material.

Preferably, on the other end of at least one spiral slot, there is provided a means for locking the pipe release means in position at a certain angle of rotation.

Preferably, locking means is provided on one end of both spiral slots.

Ideally, there is also provided a tactile indicator means on the end of the at least one spiral slot before the locking means. The sensory perception of the person rotating the pipe release member picks up a tactile indication and this tactile indicator tells the operator that further rotation of the pipe release means will bring the pipe release means into a locked position.

Preferably, the tactile indicator means is provided by a constriction of the slot.

Ideally, the width or depth of the slot is constricted.

Ideally, the tactile indicator means causing the constriction is a resilient member.

Preferably, the locking means is provided by an outstanding portion of the pipe release means adjacent the end of the spiral slot being formed to normally stand out from the surface of the pipe release means. In use, the passage of the protuberances across the outstanding portion flexes the outstanding portion into alignment with the surface of the pipe release means until the protuberances pass over the outstanding portion. The outstanding portion springs out from the pipe release means and defines a barrier to the protuberances if the operator attempts to rotate the pipe release means in the opposite direction back passed the outstanding portion.

Ideally, the slots run parallel to the end walls of the pipe release means after the tactile indicator means. When the protuberances pass the tactile indicator they enter into a portion of the parallel slot which has an exit tactile indicator spaced apart from an entry tactile indicator which exit tactile indicator is again provided by a constriction of the width or depth of the parallel slot and the tactile indicator member causing the constriction is a resilient member. The land area between the entry tactile indicator and the exit tactile indicator provides the pipe coupling with a rattle type indicator that the pipe release means is in a locked position and a pipe clamping position.

Preferably, the parallel slot continues around the external circumference of the releaser collar.

The effect of the locking means is that when the protuberance passes the entry tactile indicator the pipe release means can no longer be rotated in the opposite direction. When the protuberance has passed the entry tactile indicator of the locking means the pipe release means is in the pipe clamping position. The locking means prevents vandals or children as two examples from rotating the pipe release means into the tubular body thereby releasing the pipe engaging means from the pipe and destroying the integrity of the seal of the pipe coupling. Furthermore, the parallel slot prevents any harm coming to the pipe coupling in the event that the pipe release means is rotated beyond the exit tactile indicator as the parallel slot allows the pipe release means to spin in the endless parallel slot without causing translation of the pipe release means into or out of the tubular body. Apertures are provided in the portion of the tubular body which are in alignment with the outstanding portion of the pipe release means when the pipe release means is in the locked position. This allows a person to use a tool to compress the two outstanding portions back into alignment with the cylindrical wall of the releaser collar to allow the protuberances to move along the spiral slots to rotate the pipe release means into the tubular body.

Preferably, a spacer is mounted between the sealing means and the pipe engaging means. This spacer prevents pinching by the split grab ring or the clamping o-ring of the sealing o-ring in order to avoid any damage to the sealing o-ring which could ultimately lead to leaking.

Ideally, the internal diameter surface of the split grab ring tapers from the leading edge of the split grab ring proximal to the open end to the trailing edge distal to the open end. Advantageously, this allows smooth passage of a pipe past the split grab ring when the pipe is being inserted.

Preferably, at least a portion of the trailing edge of the split grab ring adjacent the inner diameter portion is also tapered. Advantageously, this provides a rake effect so that the portion of the grab ring which comes into contact with the pipe moving in the other direction against the rake angle is naturally further embedded into the surface of the pipe creating a greater friction grip of the pipe.

Ideally, a washer is mounted intermediate the sealing means and the stop means.

Preferably, the washer is a plastic or metal washer.

Ideally, an end face of the releaser collar proximal to and to be in contact with the split grab ring has a bevelled surface substantially parallel to and formed to co-operate with the tapered internal diameter surface of the split grab ring.

Ideally, the pipe coupling has more than one converging end for releasably coupling more than one pipe.

Preferably, the stop means is a hollow tubular body with a radially inwardly extending flange. The flange extends radially inwardly to abut against a pipe to be inserted but allows the passage of fluid.

Ideally, the stop means is coaxially aligned with the tubular body.

Preferably, the outer diameter surface of the split grab ring has a radius on its end proximal to the open end of the tubular body.

Ideally, the outer diameter surface of the split grab-ring is tapered substantially parallel to the inner surface of the converging end.

Preferably, the radial flange of the pipe stop means carries a pipe liner extending towards the open end of the pipe coupling. Advantageously, this pipe liner structurally supports the pipe to be inserted.

Ideally, the pipe liner is co-axial with the tubular body of the coupling as well as the pipe release means, the pipe engaging means and the sealing means.

Preferably, guard means are disposed on the pipe coupling to at least partially enclose the sealing means off from the end of a pipe when the pipe is being inserted or removed.

Ideally, the guard means is disposed on either or both opposing sides of the sealing means.

In a sixth embodiment, the guard means comprises two mutually opposing recesses formed in components on both sides of the o-ring for enclosing the o-ring.

In the sixth embodiment, the first recess is formed in an end face of the stop means proximal to the open end and the second recess is formed in the end face of the spacer distal to the open end.

In a seventh embodiment, the guard means is formed by a plurality of fingers projecting from the pipe release means towards the stop.

In the seventh embodiment, the pipe engaging means has apertures for slidably receiving the fingers.

In the seventh embodiment, the plurality of fingers are mounted on a ring which is coaxial with and rotatable relative to the releaser collar.

In an eighth embodiment, the guard means is formed by a cylindrical tube coaxial with and movably mounted on the tubular body.

In the eight embodiment, an end of the pipe release means has means for engaging the guard means and the guard means has a corresponding engagement means for rotational engagement with the pipe release means.

It will of course be appreciated that the guard means and the pipe release means can be fixed together so that no relative rotational motion is possible or indeed the two components can be manufactured as a single part.

Ideally, the guard means comprises a circumferential ridge portion and a cylindrical tubular portion extending there from having a plurality of apertures spaced apart from one another circumferentially. Preferably, the spaced apart apertures are in alignment with the pipe engaging means which is a split grab ring in the eighth embodiment.

Ideally, the internal diameter surface of the split grab ring has a toothed configuration so that projecting teeth are in alignment with the circumferentially spaced apertures of the cylindrical tubular portion of the guard means.

Preferably, the end of the guard means distal to the pipe release means also has a toothed configuration to provide this end of the guard means with a degree of flexibility to avoid damage to the sealing member.

Ideally, the split grab ring is pre-tensioned to grip an external surface of an inserted pipe.

It will of course be appreciated that any of the embodiments showing a tubular body with a converging end could equally have the converging end achieved by an annular ring with a tapering internal diameter surface being fixed into the open end of a tubular portion with a constant cross sectional diameter along its length.

Preferably, the open end of the tubular body and the pipe release means carry visual indicia to indicate whether the coupling is in a pipe releasing position or in a pipe clamping position.

Ideally, more than one pipe engaging means is disposed within at least one tubular body of the pipe coupling.

Preferably, more than one sealing means is provided in at least one tubular body of the pipe coupling.

Ideally, a plurality of spacers are provided in at least one tubular body of the pipe coupling.

Preferably, a plurality of washers are provided in at least one tubular body of the pipe coupling.

Ideally, lubricating means is provided on each moving part.

Preferably, a constant diameter tubular portion extends from the converging end of at least one tubular body of the pipe coupling.

Ideally, the pipe engaging means is manufactured from a plastic material with metal inserts.

Alternatively, the pipe engaging means is manufactured from a plastic material. This plastic only pipe engaging means is suitable for use with plastic or collapsible wall pipes.

Ideally, the pipe release means abuts the stop means in the pipe releasing position.

Ideally, a biasing means is provided between the spacer and the sealing means.

Accordingly, the present invention further provides a pipe coupling having sealing means disposed within the coupling and guard means movably mounted on the pipe coupling for covering and uncovering the sealing means. Advantageously, the guard means allows sealing means such as an o-ring for example to be covered when a pipe is being inserted into or removed from the coupling.

BRIEF DECRIPTION OF THE DRAWINGS

The invention will now be described with reference to the accompanying drawings which show by way of example only, six embodiments of pipe coupling in accordance with the invention. In the drawings:—

FIG. 10 is a perspective view of a tenth embodiment of pipe coupling;

FIG. 11 is a perspective view of a tool;

FIG. 12 is a perspective view of a first embodiment of releaser collar;

FIG. 13 is a perspective view of a second embodiment of releaser collar; and

FIG. 15 is an end view of a pipe release member;

FIG. 16 is a second end view of a pipe release member;

DETAILED DESCRIPTION OF THE PREFERRED EMBODIMENTS OF THE INVENTION

Figure 1:
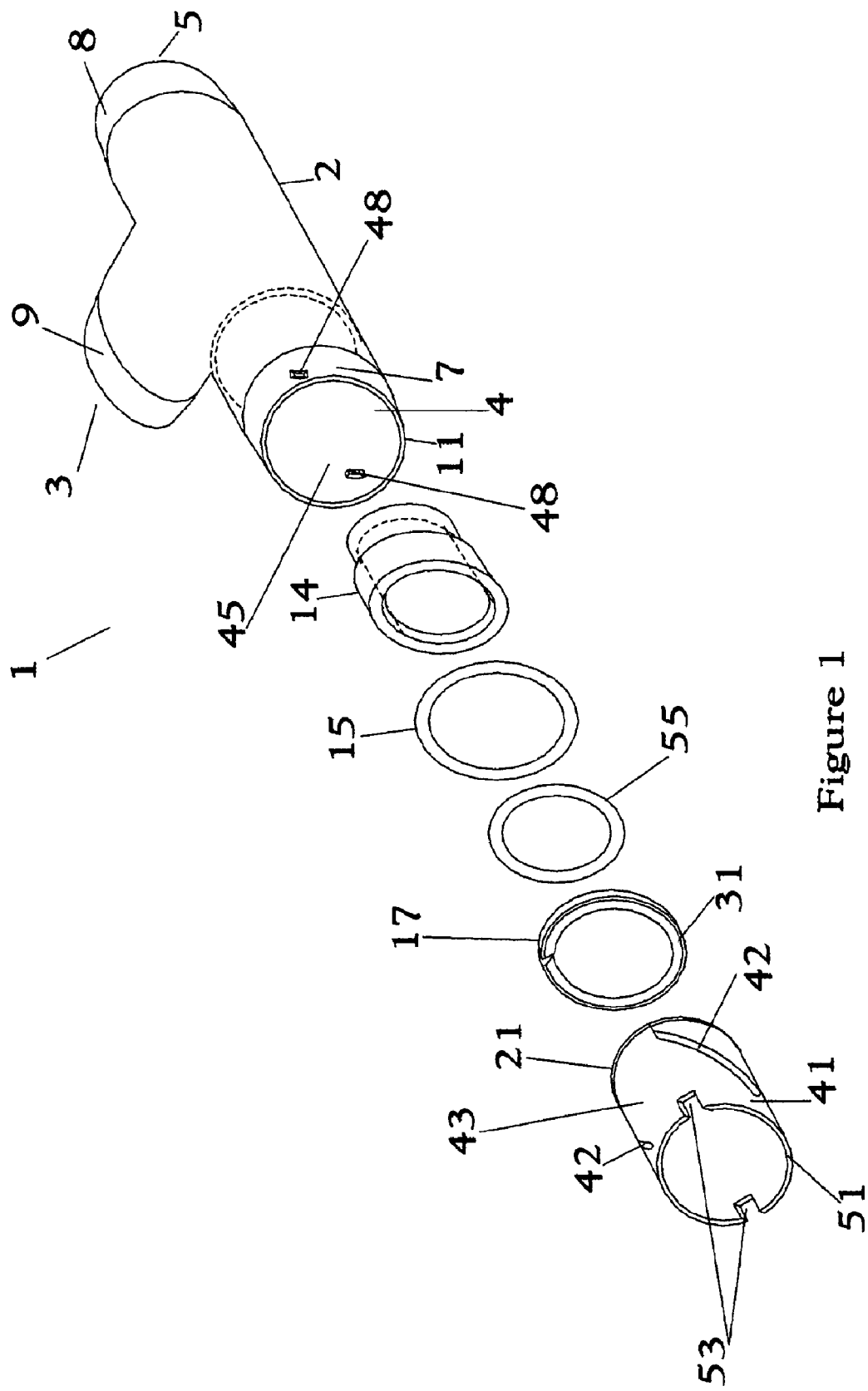
FIG. 1 is an exploded perspective view of a third embodiment of the pipe coupling assembly.

Referring to FIGS. 1 to 6 generally, there is shown a pipe coupling indicated generally by the reference numeral 1 for connecting at least two pipes in a fluid tight manner. The pipe coupling 1 has a tubular body 2 with three open ends 3, 4 and 5 see FIGS. 1 and 2. All three of the open ends 3, 4 and 5 have a converging end 7, 8 and 9 each of which define a reduced diameter opening, relative to the tubular body diameter, opening 11 being shown in FIG. 1. A stop member 14 is disposed within the tubular body 2 distal to the converging end 7 to stop a pipe 201, see FIG. 2 at a predetermined distance into the tubular body 2.

A sealing member 15 in the form of an o-ring is located intermediate the stop member 14 and the converging end 7 and a pipe engaging member 17 is disposed intermediate the sealing member 15 and the converging end 7. The pipe engaging member 17 has a variable diameter for clamping and releasing the inserted pipe 201 as a result of the diameter of the pipe engaging member 17 reducing and increasing due to translation toward and away from the converging end 7 respectively. A pipe release member 21 is located intermediate the pipe engaging member 17 and the converging end 7, the pipe release member 21 being movably mounted on the converging end 7. The pipe release member 21 remains accessible when a pipe is connected to the pipe coupling 1. The pipe release member 21 has a pipe clamping position where the pipe release member 21 is out of contact with the pipe engaging member 17 which is in a pipe clamping position. The pipe release member 21 also has a pipe release position where the pipe release member 21 is in contact with the pipe engaging member 17 which is in a pipe releasing position. The pipe release member 21 is movable between these two positions by an operator. Advantageously, this configuration allows any pipe 201 connected to the pipe coupling 1 to be demounted and remounted when required.

The pipe engaging member 17 is a split grab-ring 31 and the split grab-ring 31 is in co-axial alignment with the tubular body 2. The surface of the split grab-ring inner edge 33 is plain, see FIG. 5 and the split grab-ring 31 is manufactured from stainless steel, hardened brass or any other suitable rigid material. The pipe release member 21 comprises a releaser collar 41 having two spiral slots 42 extending longitudinally along a wall 43 of the releaser collar 41. Alternatively, one or more indentations (not shown) are used instead of slots. The releaser collar 41 is in coaxial alignment with the split grab-ring 31. The internal surface 45 of the converging end 7 has two protuberances 48 projecting radially inwardly for operable engagement with the two spiral slots 42 of the releaser collar 41.

Figure 2:
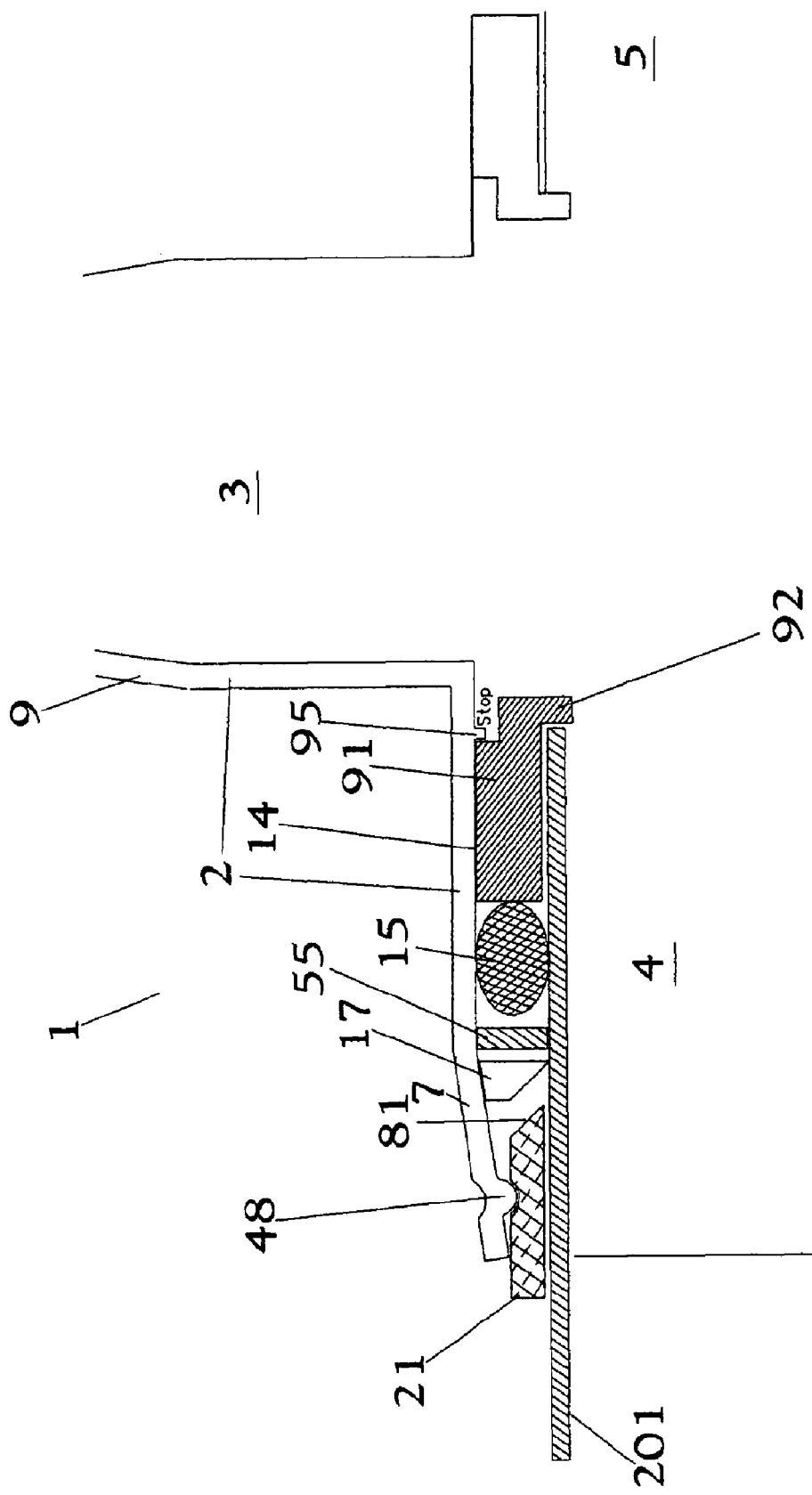
FIG. 2 is a partial sectional view of the third embodiment of a pipe coupling.

The stop member 14 has a first collar portion 91 having a radially inwardly projecting flange 92, see FIG. 2. The inner surface of the tubular body 2 defines a shoulder 95 projecting radially inwardly to abut against a portion of the stop member 14 to prevent it extending into the tubular body 2 beyond the shoulder 95.

Figure 3:
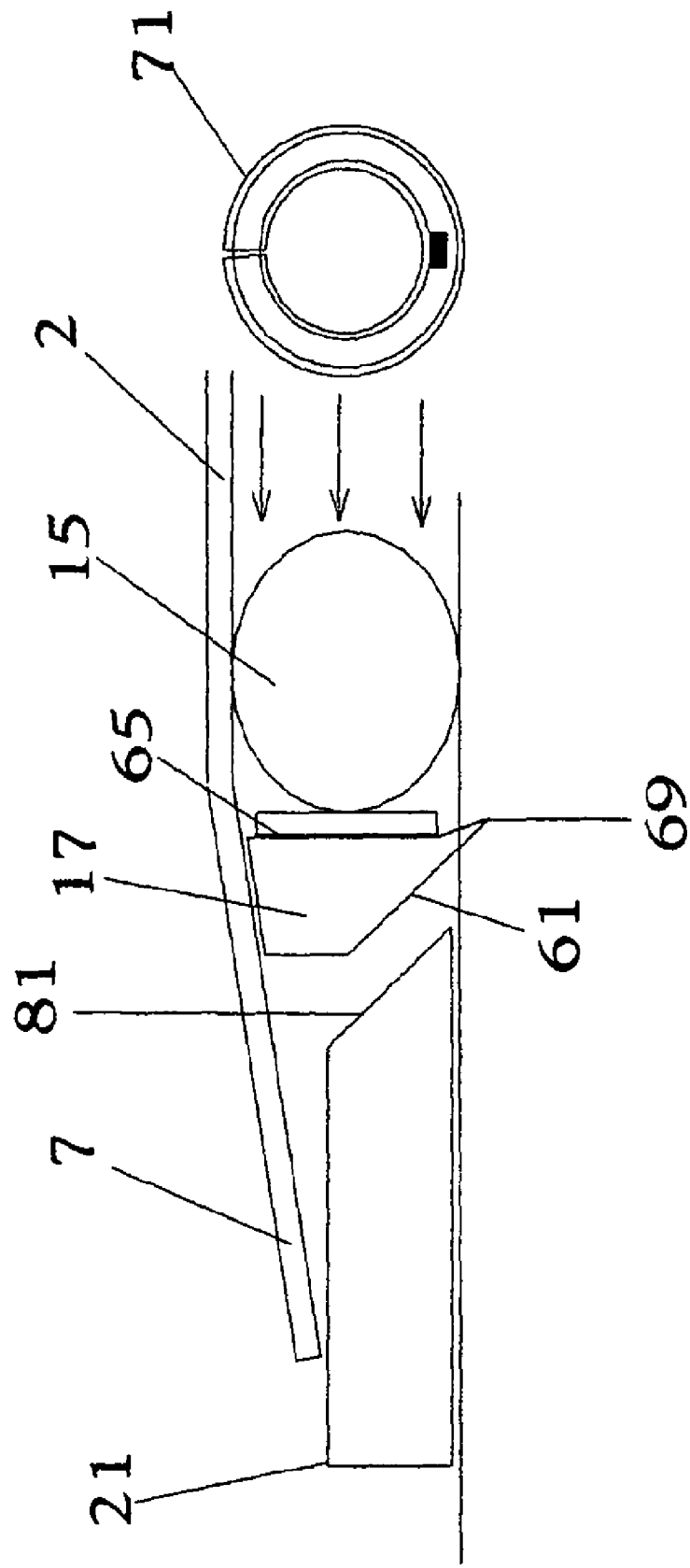
FIG. 3 is partial schematic view of one end of a pipe coupling.

An end face 51, see FIG. 1 of the releaser collar 41 adjacent the open end 11 of the tubular body 2 has a pair of diametrically opposed tool engaging slots 53. Optionally, a pair of lugs, see FIG. 13 projecting beyond the end face 51 of the releaser collar 41 are provided for engagement with a tool. A spacer 55 is mounted between the sealing member 15 and the pipe clamping member 17. The internal diameter surface 61 of the grab-ring 31 tapers from the leading edge 63 of the grab-ring 31 proximal to the converging end 7 to the trailing edge 65 distal to the converging end 7 see FIG. 5. Advantageously, this allows a pipe to be smoothly inserted into the coupling. At least a portion 69 of the trailing edge 65 of the grab-ring 31 adjacent the inner diameter portion is also tapered, see FIG. 3. A washer 71, see FIG. 3, is mounted intermediate the sealing member 15 and the stop member 14 and the washer 71 is a plastic or metal washer 71. An end face 81 of the releaser collar 41 proximal to and to be in contact with the split grab-ring 31 has a bevelled surface to co-operate with the tapered internal diameter surface 61 of the split grab-ring 31, see especially FIG. 3.

The pipe coupling 1 has two, three, four or any number of converging ends 7 for releasably coupling two, three, four or more pipes 201. A radially inwardly projecting flange 92 of the pipe stop member 14 carries a pipe liner 101 extending towards the converging end 7 of the pipe coupling 1, see FIG. 5. Advantageously, this pipe liner 101 structurally supports the pipe 201 to be inserted. The pipe liner 101 is co-axial with the tubular body 2 of the pipe coupling 1 and the pipe 201 to be inserted as well as the pipe release member 21, the pipe engaging member 17 and the sealing member 15.

Figure 4:
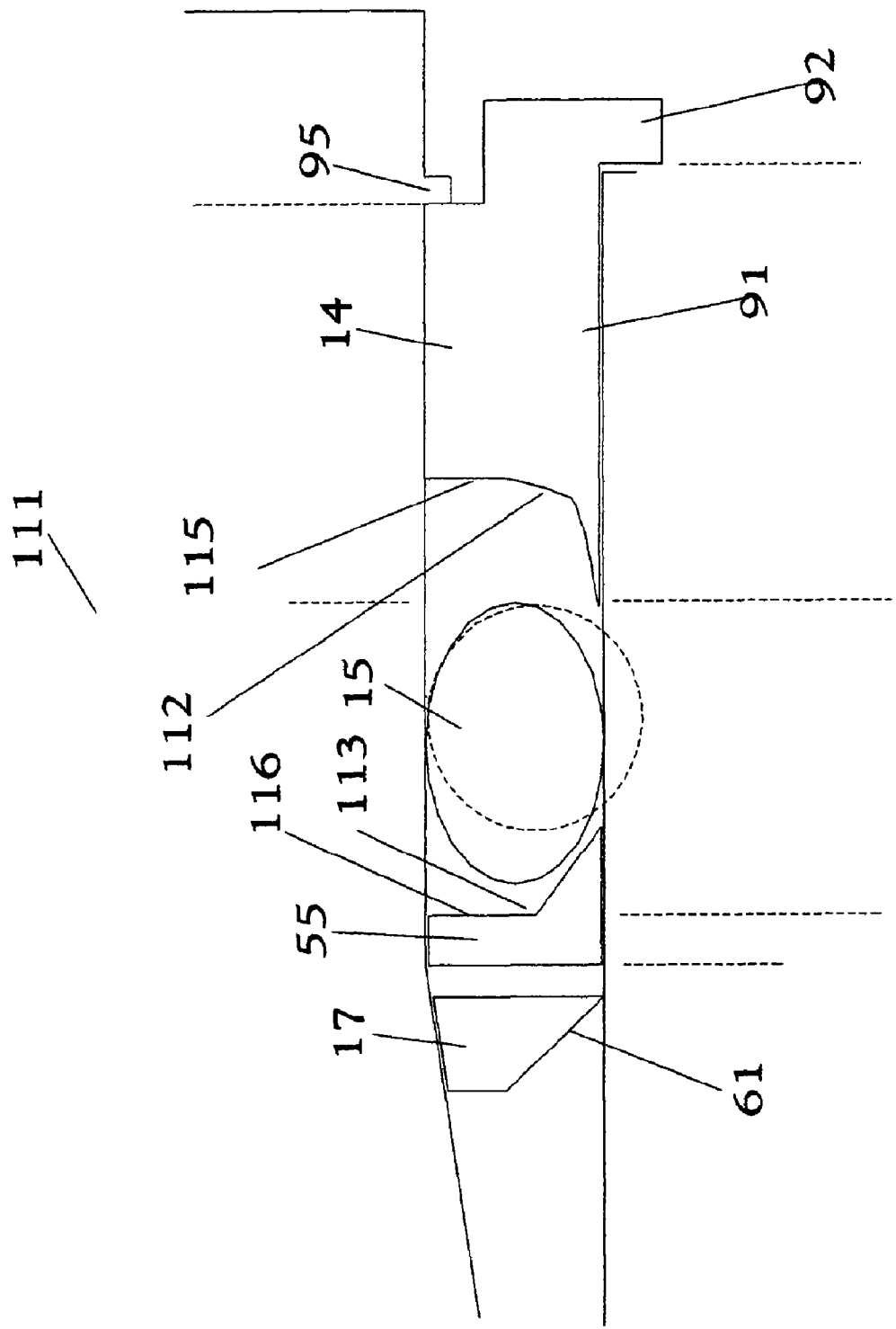
FIG. 4 is a partial sectional view of a sixth embodiment of a pipe coupling.
Figure 5:
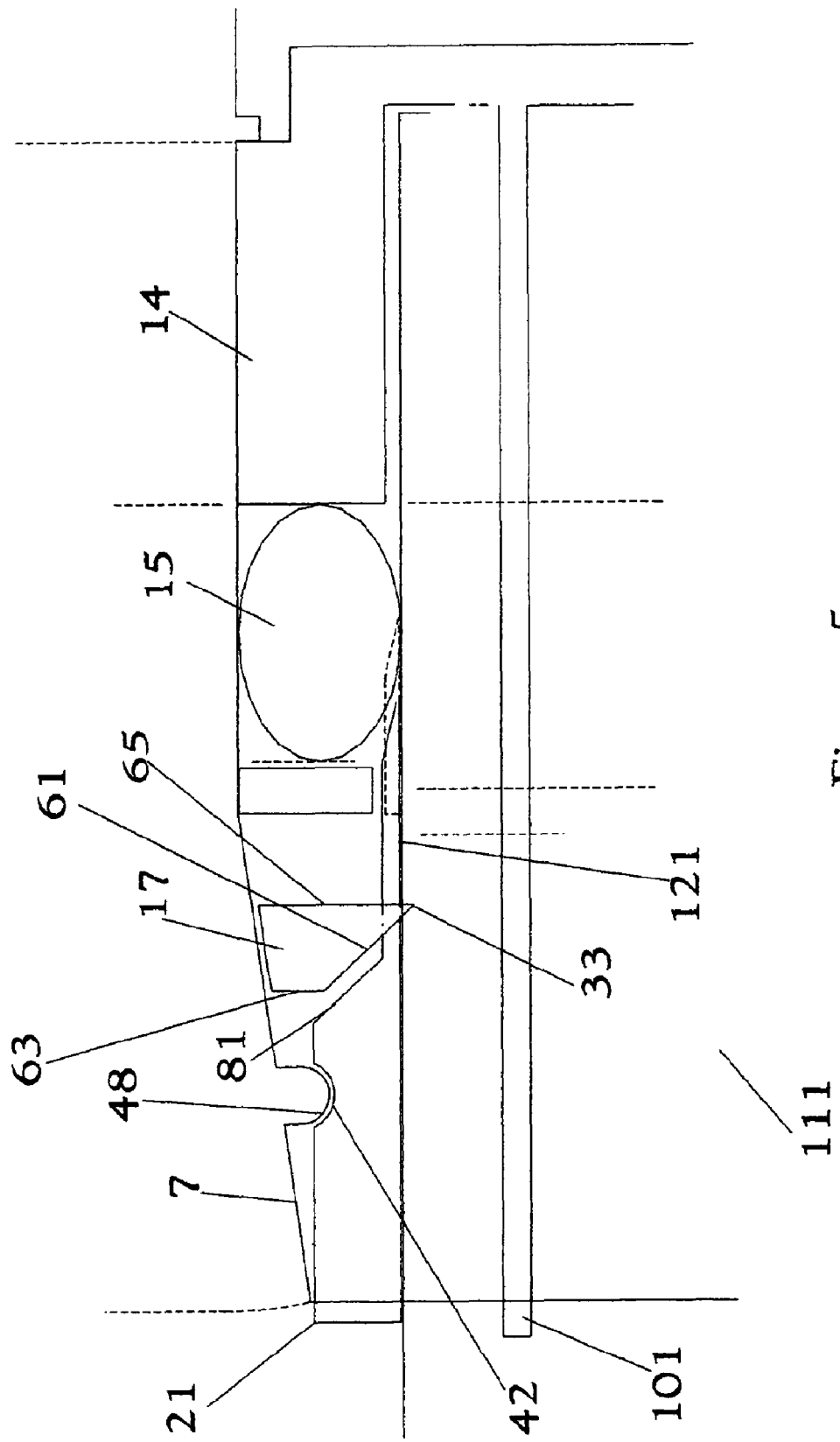
FIG. 5 is a partial sectional view of a seventh embodiment of a pipe coupling.
Figure 6:
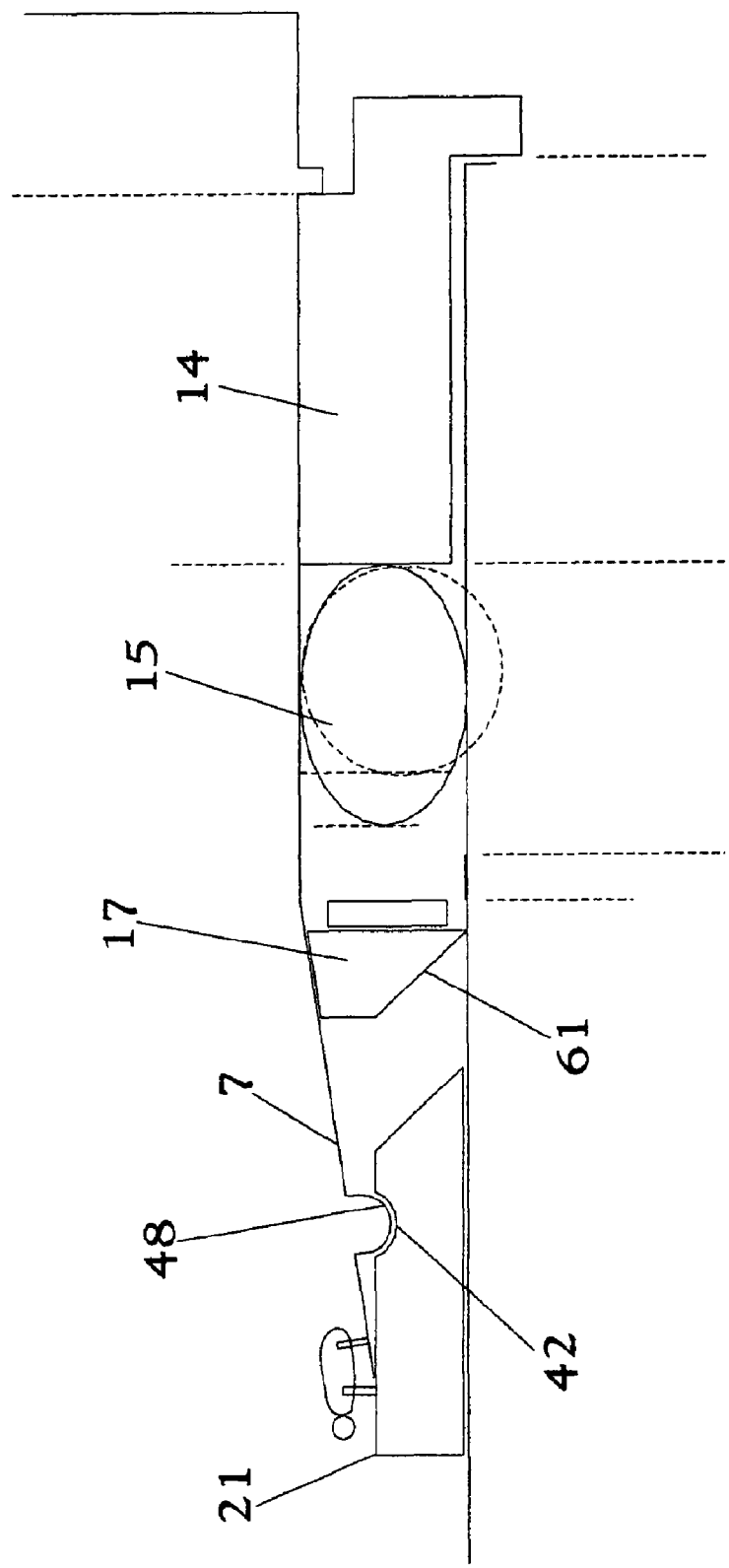
FIG. 6 is a partial sectional view of a third embodiment of pipe coupling.

A guard arrangement, see FIGS. 4 and 5, indicated generally by the reference numeral 111 is disposed on either or opposite sides of the o-ring sealing member 15 to at least partially enclose the o-ring 15 when the pipe 201 is being inserted or removed. This avoids any burrs or other discrepancies on the ends of the pipe 201 from damaging the o-rings 15 during insertion or removal.

In a first embodiment of guard arrangement shown in FIG. 4, the guard arrangement 111 comprises two mutually opposing recesses 112, 113 formed in an end face 115 of the stop member 14 proximal to the converging end 7 and the second recess 113 is formed in the end face 116 of the spacer 55 distal to the converging end.

In the second embodiment of guard arrangement shown in FIG. 5, the guard arrangement 111 is formed by a plurality of fingers 121 projecting from the pipe release member 21 towards the stop member 14. The pipe engaging member 17 has apertures for slidably receiving the fingers 121.

Figure 7:
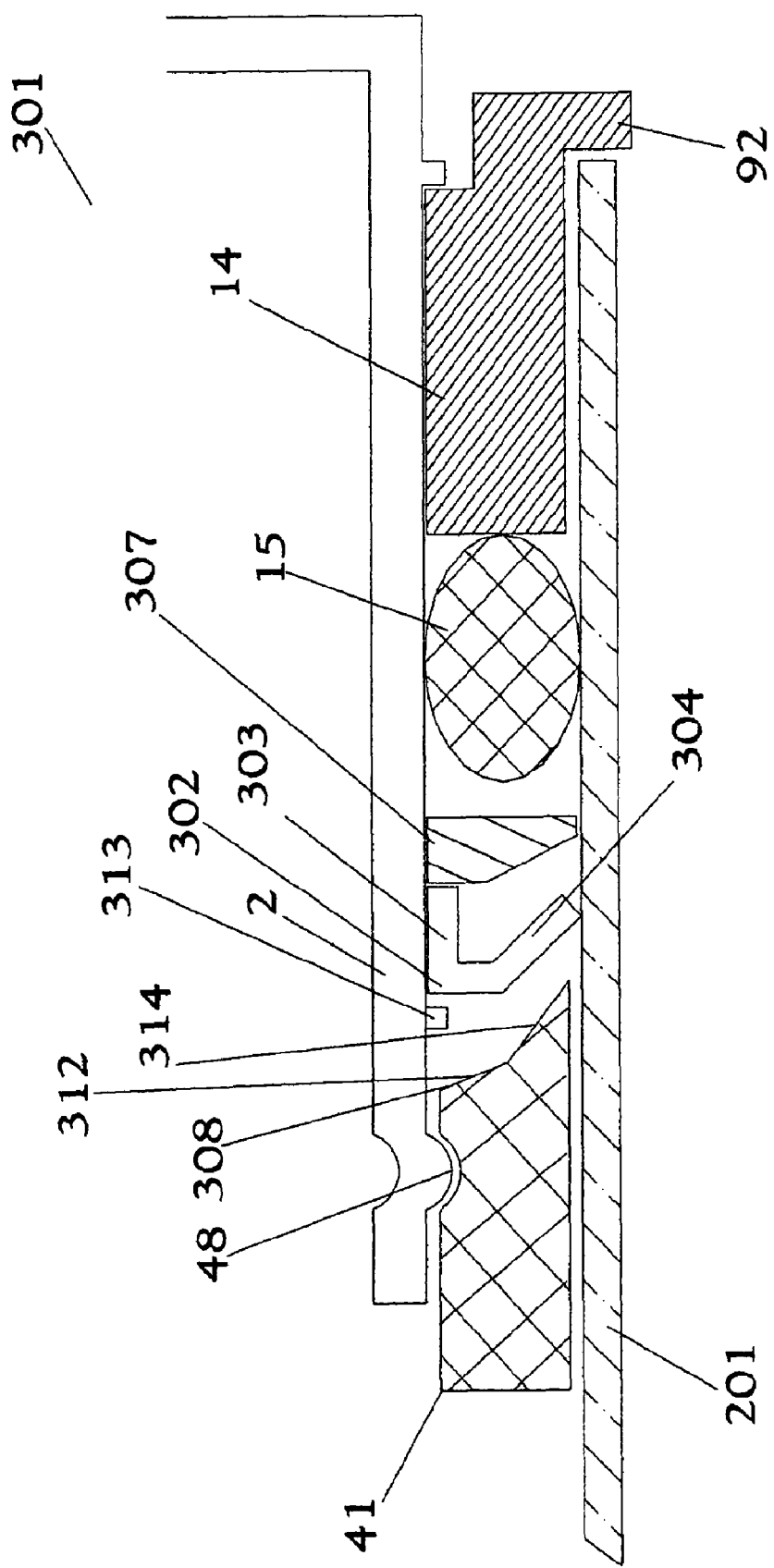
FIG. 7 is a partial sectional view of a fourth embodiment of pipe coupling.
Figure 8:
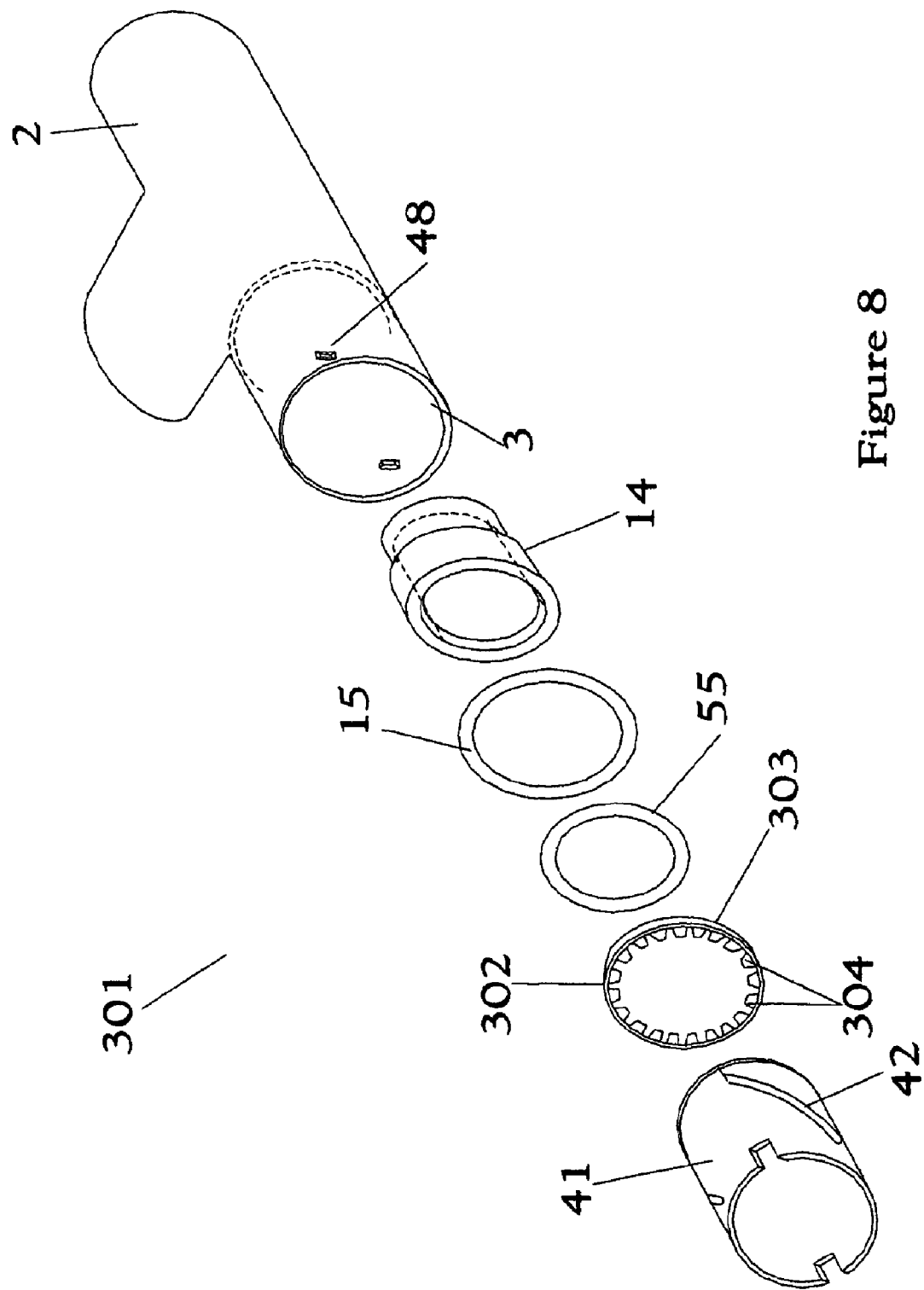
FIG. 8 is a perspective view of the fourth embodiment of a pipe coupling.

Referring now to FIG. 7 and FIG. 8 there is shown a further embodiment of pipe coupling indicated generally by the reference numeral 301 wherein features corresponding to the same features in FIG. 1 and FIG. 2 have been accorded the same reference numerals. The pipe coupling 301 differs from the pipe coupling 1 in that the tubular body 2 of pipe coupling 301 has a constant cross-sectional diameter along its entire length having no converging end. Pipe coupling 301 has a clamping o-ring 302 comprising a continuous outer ring 303 and a plurality of radially inwardly and rearwardly projecting teeth 304. Pipe stop 14, sealing o-ring 15, spacer 55 and releaser collar 41 are all equivalent to the correspondingly referenced features of FIGS. 1 and 2. The tubular body 2 of pipe coupling 301 has an abutment 307 intermediate the clamping o-ring 302 and the sealing o-ring 15 which prevents rearward motion of the clamping o-ring 302 beyond a certain point of the tubular body 2. The end face 308 of the releaser collar 41 proximal to the clamping o-ring 302 has a two part tapered surface. The outer portion of the two-part tapered surface has a first steeply inclined engaging tapered surface 312 and the inner portion of the two-part tapered surface has a second less steeply inclined engaging and lifting surface 314. An abutment 313 is provided on the internal surface of the tubular body 2 to prevent the clamping o-ring 302 from travelling beyond abutment 313 to prevent engagement with the releaser collar 41 if the pipe 201 is dragged out of the tubular body 2.

In use, an operator presses a pipe 201 into the open end 3 of the pipe coupling 301. The rearwardly projecting teeth 304 are sufficiently flexible and are angled to allow smooth insertion of the pipe 201 into the coupling 301 until the end of the pipe 201 comes into contact with the radially inwardly projecting flange 92 of the stop member 14. It is important at this point to ensure that the releaser collar 41 is in a pipe clamping position as shown in FIG. 7 out of contact with the clamping o-ring 302. Any effort to remove the pipe 201 while the release collar 41 is in this position will result in the teeth 304 digging into the external surface of the pipe 201 locking it in position. It is practically impossible for the pipe 201 to be removed because as the force acting on the pipe 201 is increased, the teeth 304 dig further into the tubular body of the pipe 201. When an operator wishes to demount the pipe 201 from the pipe coupling 301, the releaser collar 41 is rotated and the interaction of the spiral slots 42 and the protuberances 48 cause translation of the releaser collar 41 into the open end 3 of the tubular body 2. The less steeply inclined engaging and lifting surface 314 of the releaser collar 41 engages the teeth 304 and lifts them out of contact with the pipe 201. Clamping o-ring 302 is inclined to move away from the releaser collar 41 until it comes into contact with abutment 307 which prevents further rearward motion of the clamping o-ring 302. At this point the teeth 304 remain clear of the pipe 201 compressed between the engaging and lifting surface 314 of the releaser collar 41 and the abutment 307.

Figure 9:
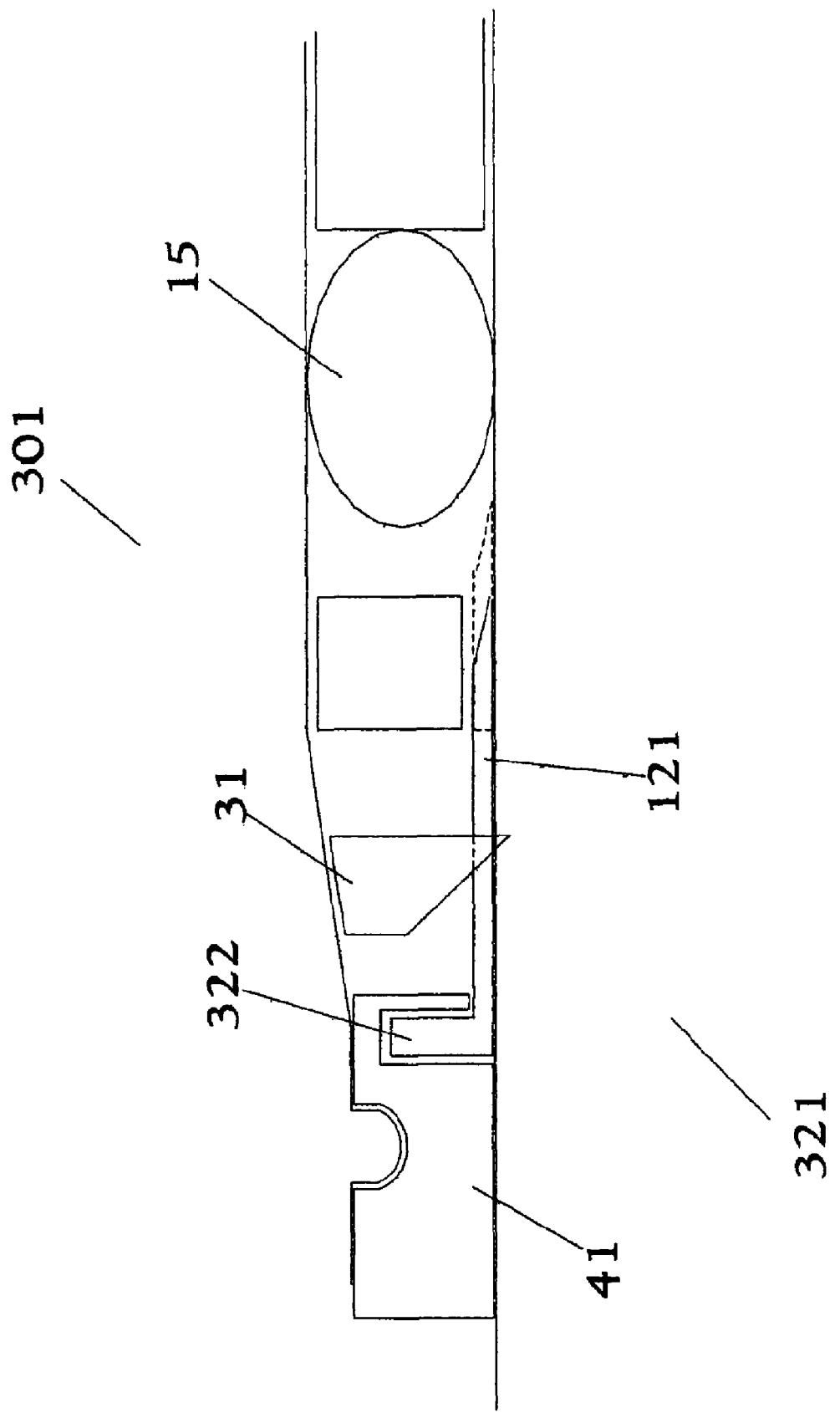
FIG. 9 is a schematic view of a ninth embodiment of pipe coupling.

Referring now to FIG. 9, there is shown a pipe coupling 301 having a guard arrangement indicated generally by 321 similar to the guard arrangement 111 shown in FIG. 5. Features of the guard arrangement 321 corresponding to identical features of the guard arrangement 111 have been designated the same reference numerals. The guard arrangement 111 of FIG. 5 has a plurality of fingers 121 integrally formed with the release collar 41. The guard arrangement 321 of FIG. 9 has a plurality of fingers 121 coupled together by an annular ring 322 and independent from the releaser collar 41. The plurality of fingers 121 and annular ring 322 are rotatable relative to the releaser collar 41. In use, an operator rotates the releaser collar 41 so that it moves into the tubular body 2. The plurality of the fingers 121 are moved by the releaser collar 41 and slide underneath the sealing o-ring 15 and when the pipe 201 is inserted into the pipe coupling 301, the plurality of fingers 121 guard the sealing o-ring 15 from damage caused by uneven portions on the end of the pipe 201.

Referring to FIG. 10, there is shown an embodiment of pipe coupling 301 which does not require a tool to mount and demount a pipe 201. The end 331 of the releaser collar 41 which is accessible when the releaser collar 41 is inserted into the tubular body 2 is knurled for operation by a persons hand. The releaser collar 41 and the tubular body 2 both have a locking tab 333.

In FIG. 11, one embodiment of tool 341 is shown comprising a handle 343 and an open ended annular ring 344. Two lugs 345 project orthogonally out of the main plane of the tool 341 and are formed for engagement with two slots 53 formed on the releaser collar 41 shown in FIG. 12. FIG. 13 shows a releaser collar 41 which has two protruding tabs 351 instead of slots 53. The releaser collar 41 of FIG. 13 could be used in a situation where the pipe 201 is to be mounted without the option of demounting it. In such a situation the pipe 201 is mounted, the releaser collar 41 is located in the pipe clamping position with only the two tabs 351 exposed beyond the tubular body 2 and the two tabs 351 are removed by cutting or snipping.

Figure 14:
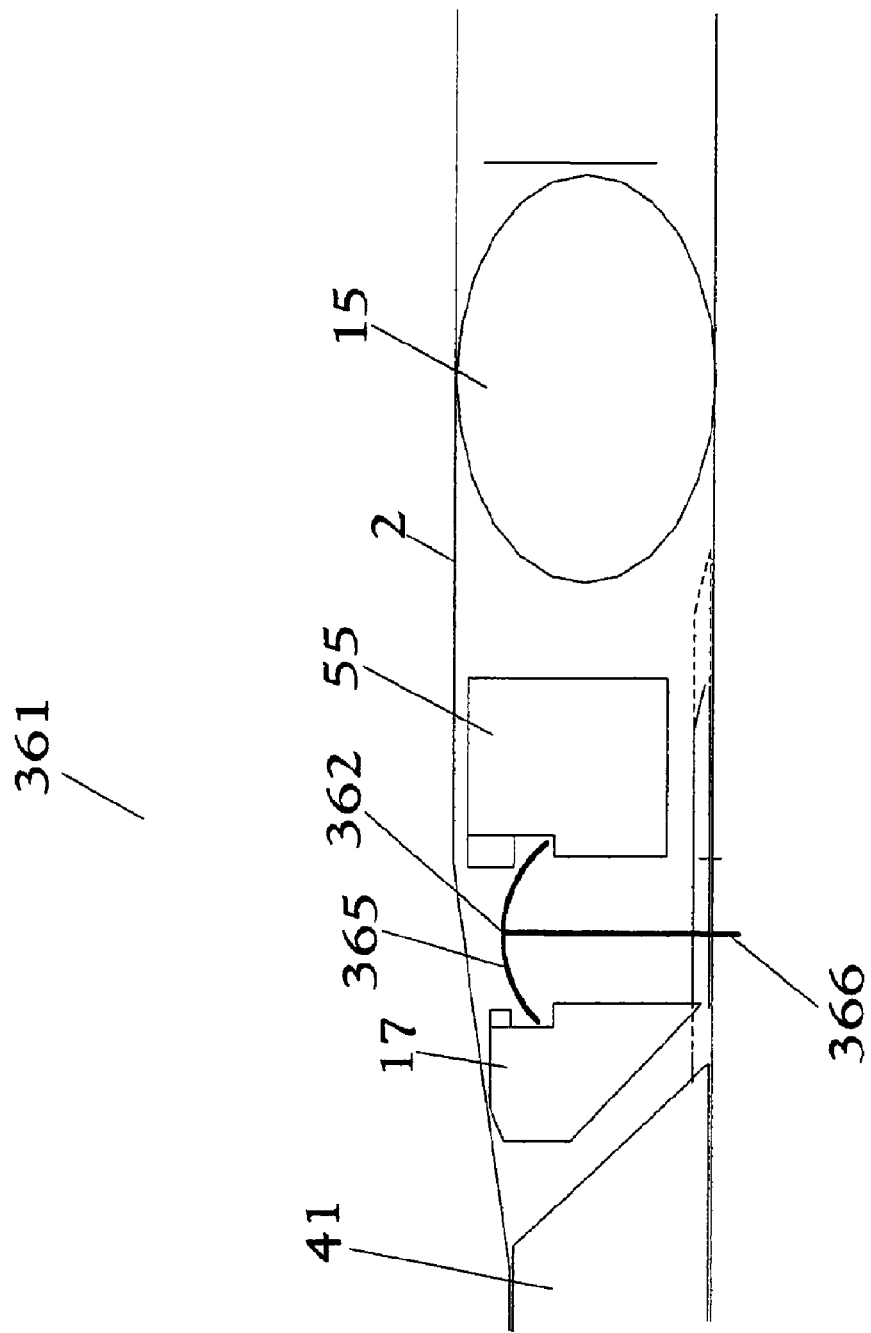
FIG. 14 is a partial schematic drawing of a converging end of an eleventh embodiment of pipe coupling.

In FIG. 14, there is shown a safety device indicated generally by the reference numeral 361 comprising a retractable barrier 362 which protrudes into the bore of the tubular body 2 preventing a pipe being fully inserted into the pipe coupling when the guard arrangement 111, 321 is not in a position to cover the sealing o-ring 15. The retractable barrier 362 is retracted out of the bore of the tubular body 2 when the guard arrangement is covering the sealing o-ring 15. The retractable barrier 362 comprises a flexible member 365 intermediate the pipe clamping means 17 and a spacer 55 and barrier member 366 extending from the flexible member 365 into the bore of the tubular body 2 to prevent passage of the pipe 201 in a normal position. In use, when the releaser collar 41 is in a position such that the guard arrangement 111, 321 at least partially covers the sealing o-ring 15, the spacer 55 and the pipe clamping means 17 compress the flexible member 365 lifting the barrier member 366 out of the bore of the tubular body 2. At this stage, the sealing o-ring 15 is at least partially covered so it is safe to insert the pipe 201.

Referring now to FIGS. 15 and 16, there is shown one end of a pipe release member 21 and the pair of protuberances 48 sitting into one end position of a pair of spiral slots 42. The end of the pipe release member 21 shown in both of these drawings is the end distal to the pipe coupling 1. With the protuberances 48 in the position shown the pipe release member 21 is rotated into the tubular body 2 of the pipe coupling 1 as far as possible apart from the small amount of travel 506 to the left of the upper protuberance 48 and to the right of the lower protuberance 48. Therefore, the guard member movable by the pipe release member 21 is covering the sealing member 15 when the protuberances 48 are sitting in the end portions of the spiral slots 42 distal to the pipe coupling 1 as shown in FIGS. 15 and 16. Referring initially to FIG. 15, there is shown a pipe entry blocking mode of the pipe release member 21. A lever arrangement is shown indicated generally by the reference 501 having a lever member 502 mounted on the releaser collar 41 at or about the end of the spiral slot 42. The longitudinal axis of the lever member 502 is substantially in alignment with the portion of the spiral slot 42 adjacent to the lever member 502 and the lever member 502 is pivotally mounted about one end of the spiral slot 42.

A protruding end 504 of the lever member 502 protrudes into the internal space 521 defined by the pipe release member 21 and prevents a pipe 201 being inserted into the pipe coupling 1 beyond the protruding end 504 of the lever member 502. An actuating member 508 of the lever member 502 on the opposite side of the pivotal connection to the protruding end 504 has a ramp 509 and as shown in FIG. 16, as the releaser collar 41 is rotated clockwise the protuberances 48 mount the ramps 509 which pivots the protruding end 504 of the lever member 502 out of the internal space 521 defined by the releaser collar 41 allowing a pipe 201 to be inserted as shown. When the pipe 201 is inserted it maintains the protruding end 504 of the lever member 502 in the position shown in FIG. 16. A groove (not shown) is formed on the surface of the actuating member 508 into which the protuberances 48 drop as it reaches the position shown in FIG. 15 and the face of the groove opposing the ramp 509 has a step 511 shown in hidden lines in both FIGS. 15 and 16 which locks the protuberances 48 in position preventing anticlockwise rotation of the releaser collar 41 as shown in FIG. 15 until the protuberances are moved into the position shown in FIG. 16 where the pivotal motion of the lever member 502 causes the step 511 to be moved radially inwards a sufficient distance to allow the protuberances 48 to pass allowing the pipe release member 21 to be rotated anticlockwise.

The effect of this lever arrangement 501 is to prevent a pipe 201 being inserted until the pipe release member 21 is rotated substantially fully into the tubular body 2 to cover the sealing member 15. This prevents the integrity of the seal being compromised by burrs or other discrepancies on the end of the pipe 201. Furthermore, as a result of the step 511 it is only possible to rotate the pipe release member 21 out of the tubular body 2 into a pipe clamping position when the pipe 201 has been inserted to maintain the protruding end 504 of the lever arrangement 501 in alignment with the internal circumference of the releaser collar 41.

In the event that the pipe release member 21 is in a pipe clamping position without the pipe 201 inserted into the pipe coupling 1, then a reset blank (not shown) is required to be inserted into the tubular body 2 to support the inner wall of the guard member before returning it to the pipe release position. This reset blank will contact the sealing member 15 therefore it has a leading edge free from burrs and has flats or grooves to bypass the protruding ends 504 of the lever members 502 and is manufactured from a plastic material.

Figure 18:
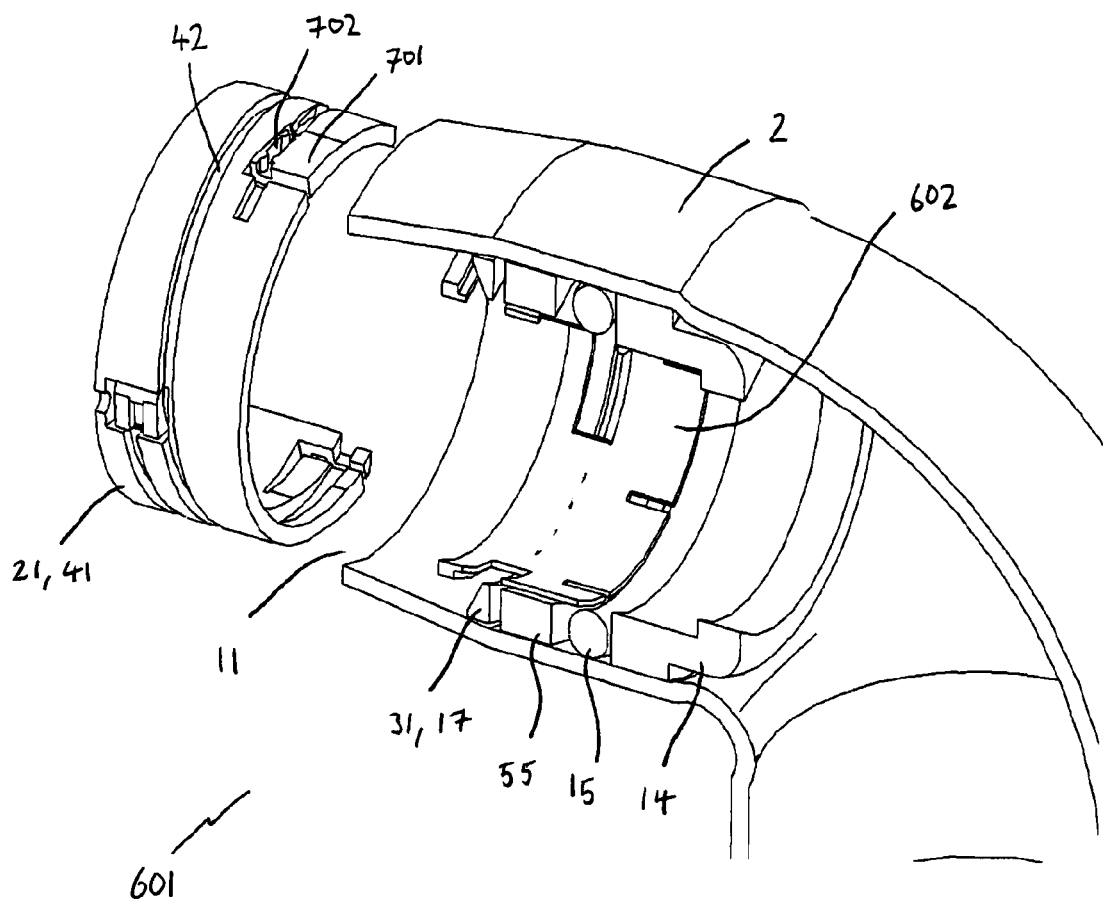
FIG. 18 is a second sectional partial internal view of the pipe coupling of FIG. 17.

On the other end of both spiral slots 42, there is provided a member 701, see FIG. 18 for locking the protuberances 48 in position when they pass a certain position on the spiral slots 42. There is also provided a tactile indicator 702 which the sensory perception of the person rotating the pipe release member 21 picks up and this tactile indicator 702 tells the operator that further rotation of the pipe release member 21 will bring the pipe release member 21 into a locked position. The tactile indicator 702 is provided by a constriction of the width or depth of the slot 42 and the tactile indicator member causing the constriction is a resilient member. The locking member 701 is provided by an outstanding portion of the pipe release member 21 adjacent the end of the spiral slots 42 being formed to normally stand out from the cylindrical curved surface of the releaser collar wall. The passage of the protuberances 48 across the outstanding portion flexes the outstanding portion into alignment with the cylindrical curved surface of the releaser collar wall until the protuberances 48 pass over the outstanding portion. The outstanding portion springs out from the releaser collar wall and defines a barrier to the protuberances if the operator attempts to rotate the releaser collar 41 in the opposite direction back passed the outstanding portion.

The angle of orientation of the spiral slots 42 changes after the tactile indicators with the slots running parallel to the end walls of the releaser collar 41. When the protuberances 48 pass the tactile indicators 702 they enter into a portion of the parallel slots which have an exit tactile indicator spaced apart form the entry tactile indicator which is again provided by a constriction of the width or depth of the parallel slot and the tactile indicator member causing the constriction is a resilient member. The land area between the entry tactile indicator and the exit tactile indicator provide the pipe coupling 1 with a rattle like indicator that the pipe release member 21 is in a pipe clamping position.

The parallel slots continue around the external circumference of the releaser collar 41. The effect of the locking member is that when the protuberances 48 pass the entry tactile indicators the pipe release member 21 can no longer be rotated in the opposite direction. When the protuberances 48 have passed the entry tactile indicators of the locking member the pipe release member 21 is in the pipe clamping position. The locking member 701 prevents vandals or children as two examples from rotating the pipe release member 21 into the tubular body 2 thereby releasing the pipe engaging member 17 from the pipe 201 and destroying the integrity of the seal of the pipe coupling 1. Furthermore, the parallel slots prevent any harm coming to the pipe coupling 1 in the event that the pipe release member 21 is rotated beyond the exit tactile indicator as the parallel slots allow the pipe release member 21 to spin in the endless parallel slots without causing translation of the pipe release member 21 into or out of the tubular body 2. Apertures are provided in the portion of the tubular body 2 which are in alignment with the outstanding portion of the pipe release member 21 when the pipe release member 21 is in the locked position. This allows a person to use a tool to compress the two outstanding portions back into alignment with the cylindrical wall of the releaser collar 41 to allow the protuberances 48 to move along the spiral slots 42 to rotate the pipe release member 21 into the tubular body 2.

Figure 17:
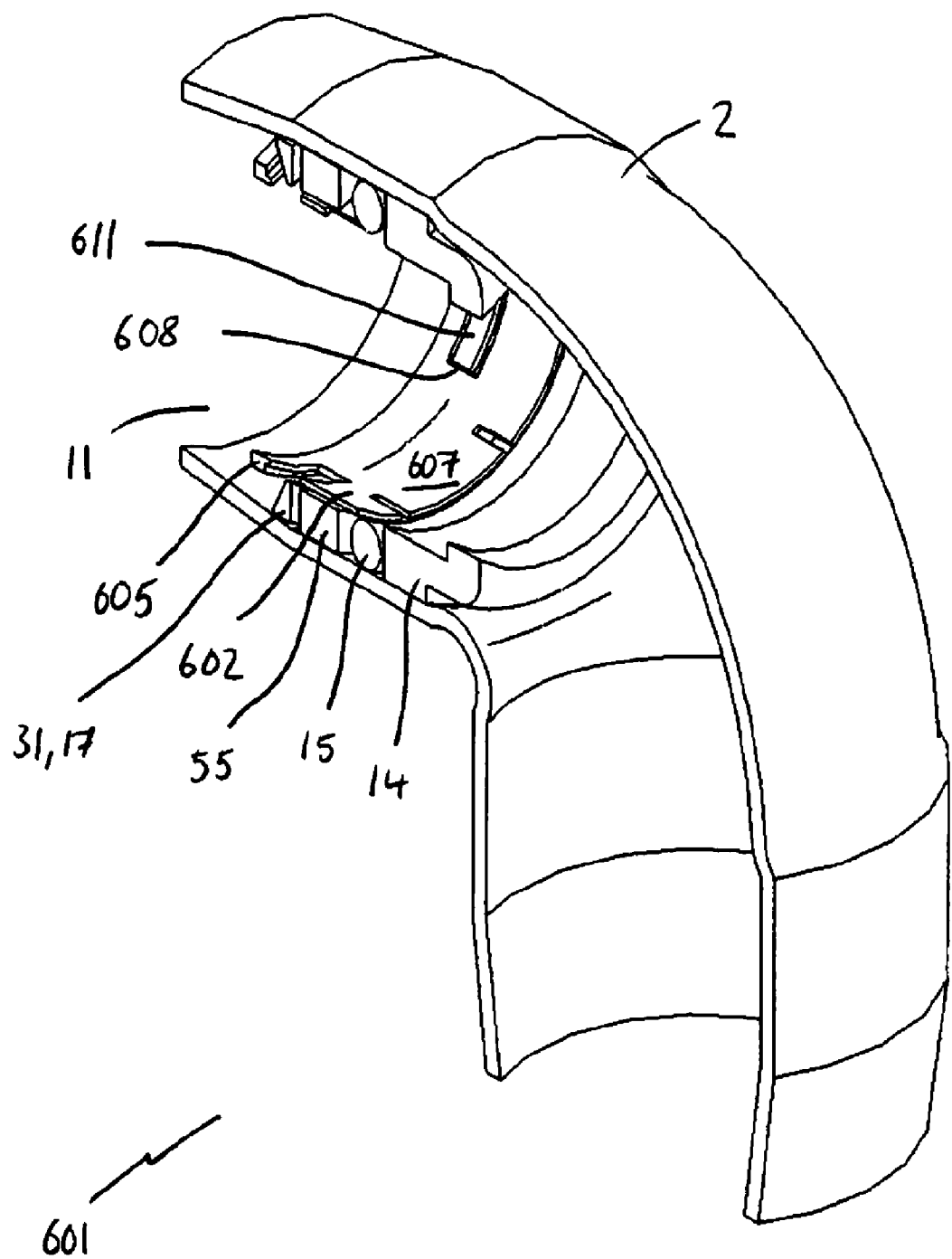
FIG. 17 is a sectional partial internal view of a ninth embodiment of pipe coupling.

Referring now to FIGS. 17 and 18 there is shown an eleventh embodiment of pipe coupling indicated generally by the reference numeral 601. The tubular body 2 of the pipe coupling 1 houses a stop member 14, a sealing member 15 in the form of an o-ring and a spacer 55. A pipe engaging member 17 in the form of a split grab ring 31 is provided adjacent the spacer 55 and a pipe release member 21 in the form of a releaser collar 41, see FIG. 18, is mounted in the open end 11 of the tubular body 2 of the coupling with one end of the releaser collar 41 in operable engagement with a guard member 602. The guard member 602 and the releaser collar 41 are shown in the pipe clamping position with the o-ring exposed in a sealing mode of operation. In this position, a pipe is normally inserted although no pipe is shown here for the purposes of clarity. The end of the releaser collar 41 engaged with the guard member 602 has a groove 603 parallel to the end wall of the releaser collar 41 running around its internal surface and the guard member 602 has a protruding circumferential ridge 605 for insertion and slidable engagement within the groove 603.

It will of course be appreciated that the guard member 603 and the releaser collar 41 can be fixed together so that no relative rotational motion is possible or indeed the two components 41, 603 could be manufactured as a single part. The guard member 603 comprises the circumferential ridge portion and has a cylindrical portion 607 having a plurality of apertures 608 spaced apart from one another circumferentially in alignment with the split grab-ring 31. The internal diameter surface of the split grab ring 31 has a toothed configuration so that the projecting teeth 611 are in alignment with the circumferentially spaced apertures 608 of the guard member 603. The end of the guard member 603 distal to the releaser collar 41 also has a toothed configuration to provide this end of the guard member 603 with a degree of flexibility to avoid damage to the o-ring sealing member 15. As the releaser collar 41 is rotated into the tubular body 2 the toothed end of the guard member 603 pass over the o-ring 15 preventing a pipe to be inserted from causing any damage to the o-ring 15. The apertures 608 of the guard member 603 engage split grab-ring 31 and move it away from the converging end of the tubular body 2 allowing the split grab ring 31 to expand. The pipe 201 is then inserted until it contacts the stop member 14. The releaser collar 41 is then rotated out of the tubular body 2 and the apertures 608 engage the split grab ring 31 and move it along the converging end. The split grab ring 31 is compressed by the taper on the converging end of the tubular body 2 and the teeth 611 protrude through the apertures 608 and grip the external surface of the inserted pipe 201. The split grab ring 31 is pre-tensioned to grip the external surface of the pipe 201.

It will of course be appreciated that any of the embodiments showing a tubular body with a converging end could equally have the converging end achieved by an annular ring with a tapering internal diameter surface being fixed into the open end of a tubular portion with a constant cross sectional diameter along its length.

Figure 19:
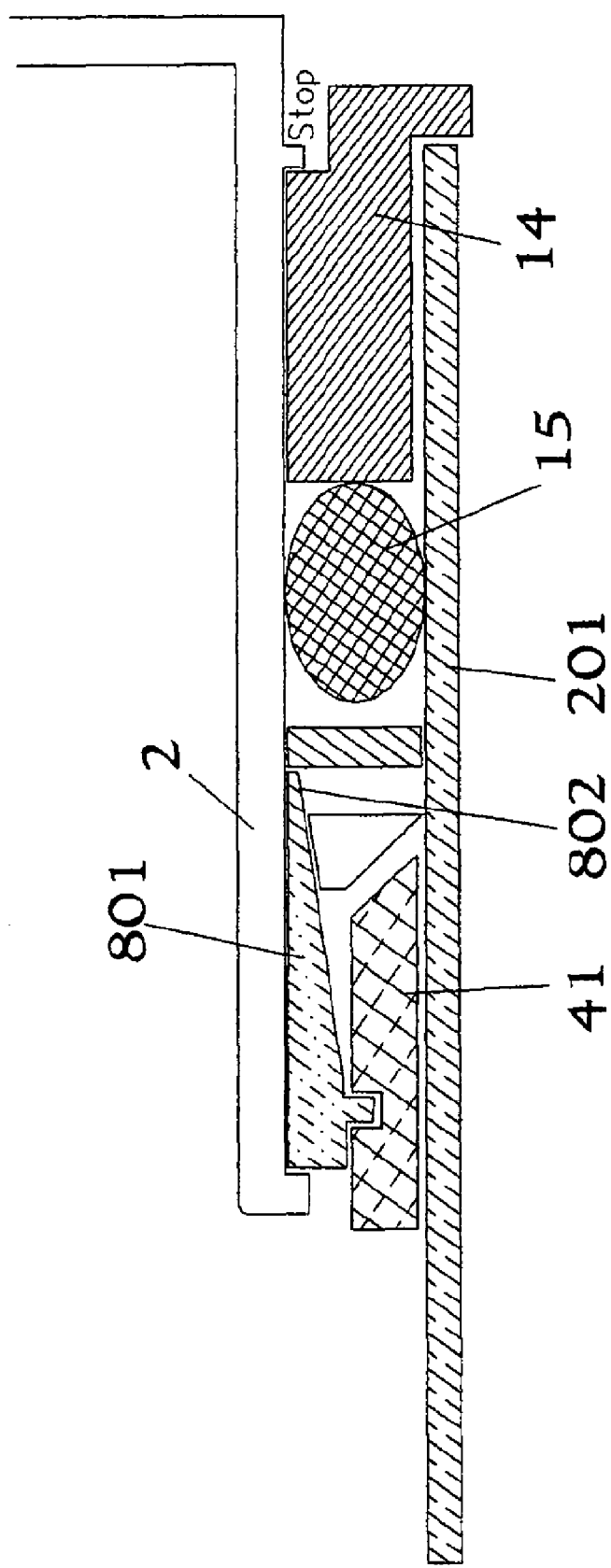
FIG. 19 is a cross-sectional partial view of a fifth embodiment of pipe coupling.

FIG. 19 shows an annular insert 801 having an inner diameter surface 802 tapering towards the open end 11 of the tubular body. The annular insert 801 is fixed proximal to the open end 11 of a constant internal diameter tubular body 2.

Variations and modifications can be made without departing from the scope of the invention as defined in the appended claims.

The invention claimed is:

1. A pipe coupling comprising a tubular body having at least one open end, stop means disposed within the tubular body distal to the open end to stop a pipe when it is inserted a predetermined distance into the tubular body, sealing means adapted to engage an outer surface of the pipe, the sealing means is intermediate the stop means and the open end, and a pipe engaging means having a variable diameter to clamp and release an inserted pipe as a result of the diameter of the pipe engaging means reducing and increasing respectively and a pipe release means, the pipe release means being movably mounted in the open end and having a pipe clamping position and a pipe release position, the pipe release means being movable between these two positions by an operator, guard means being movably mounted in the pipe coupling to cover the sealing means when the pipe is being inserted or removed and the guard means is formed by a cylindrical tube coaxial with and moveably mounted in the tubular body whereby the sealing means is protected from the pipe by the guard means when the pipe is being inserted or removed.

2. A pipe coupling according to claim 1, wherein the tubular body includes a shoulder projecting radially inwardly to abut against a portion of the stop means configured to prevent the stop means from extending into the tubular body beyond the shoulder.

3. A pipe coupling according to claim 2, wherein an annular insert having an inner diameter surface tapering towards the open end is located proximal to the open end of the tubular body.

4. A pipe coupling according to claim 3, wherein barrier means are mounted on the pipe coupling to prevent a pipe being inserted when the sealing means is uncovered.

5. A pipe coupling according to claim 4, wherein locking means are provided for locking the pipe release means in a pipe clamping position.

6. A pipe coupling according to claim 5, wherein the moving means is at least one spiral slot extending longitudinally along an external wall of the releaser collar.

7. A pipe coupling according to claim 6, wherein the barrier means comprises a lever member mounted on the releaser collar.

8. A pipe coupling according to claim 7, wherein the lever member is pivotally mounted at or about the end of at least one spiral slot.

9. A pipe coupling according to claim 8, wherein a protruding end of the lever member protrudes into the internal space defined by the releaser collar.

10. A pipe coupling according to claim 9, wherein an actuating member of the lever member on the opposite side of the pivotal connection to the protruding end has a ramp.

11. A pipe coupling according to claim 7, wherein a protruding end of the lever member protrudes into the internal space defined by the releaser collar.

12. A pipe coupling according to claim 6, wherein there is provided a tactile indicator means on the end of the at least one spiral slot before the locking means.

13. A pipe coupling according to claim 12, wherein the tactile indicator means is provided by a constriction of the slot.

14. A pipe coupling according to claim 6, wherein the locking means is provided by an outstanding portion of the pipe release means adjacent the end of the spiral slot being formed to normally stand out from a surface of the pipe release means.

15. A pipe coupling according to claim 5, wherein the releaser collar has two spiral slots.

16. A pipe coupling according to claim 15, wherein the internal surface of the open end of the tubular body has two protuberances projecting radially inwardly for operable engagement with the two spiral slots.

17. A pipe coupling according to claim 16, wherein the barrier means comprises a lever member mounted on the releaser collar.

18. A pipe coupling according to claim 17, wherein the lever member is pivotally mounted at or about the end of the spiral slots.

19. A pipe coupling according to claim 18, wherein an actuating member of the lever member on the opposite side of the pivotal connection to the protruding end has a ramp.

20. A pipe coupling according to claim 19, wherein a groove is formed on the surface of the actuating member into which the protuberances drop and the face of the groove opposing the ramp has a step.

21. A pipe coupling according to claim 15, wherein the locking means is provided on one end of both spiral slots.

22. A pipe coupling according to claim 15, wherein there is provided a tactile indicator means on the end of the at least one spiral slot before the locking means.

23. A pipe coupling according to claim 22, wherein the slots run parallel to end walls of the pipe release means after the tactile indicator means.

24. A pipe coupling according to claim 23, wherein the parallel slot continues around the external circumference of the pipe release means.

25. A pipe coupling according to claim 1, wherein locking means are provided for locking the pipe release means in a pipe clamping position.

26. A pipe coupling according to claim 25, wherein the pipe release means comprises a releaser collar having moving means for moving the releaser collar relative to the tubular body.

27. A pipe coupling according to claim 26, wherein the locking means is provided on the pipe release means.

28. A pipe coupling according to claim 27, wherein the locking means is provided on the releaser collar.

29. A pipe coupling according to claim 25, wherein the locking means is provided on the pipe release means.

30. A pipe coupling according to claim 1, wherein a portion of the tubular body proximal to the open end has an internal diameter tapering towards the open end.

31. A pipe coupling according to claim 1, wherein an annular insert having an inner diameter surface tapering towards the open end is located proximal to the open end of the tubular body.

32. A pipe coupling according to claim 1, wherein barrier means are mounted on the pipe coupling to prevent a pipe being inserted when the sealing means is uncovered.

33. A pipe coupling according to claim 32, wherein locking means are provided for locking the pipe release means in a pipe clamping position.

34. A pipe coupling according to claim 33, wherein the pipe release means comprises a releaser collar having moving means for moving the releaser collar relative to the tubular body.

35. A pipe coupling according to claim 34, wherein the moving means is at least one spiral slot extending longitudinally along an external wall of the releaser collar.

36. A pipe coupling according to claim 35, wherein the locking means is provided on one end of the at least one spiral slot on the releaser collar.

37. A pipe coupling according to claim 34, wherein the barrier means comprises a lever member mounted on the releaser collar.

38. A pipe coupling according to claim 37, wherein a protruding end of the lever member protrudes into the internal space defined by the releaser collar.

39. A pipe coupling according to claim 1, wherein the pipe engaging means is a split grab ring.

40. A pipe coupling according to claim 39, wherein the guard means comprises a circumferential ridge portion and a cylindrical portion extending therefrom having a plurality of apertures spaced apart from one another circumferentially in alignment with the pipe engaging means.

41. A pipe coupling according to claim 40, wherein the internal diameter surface of the split grab ring has a toothed configuration so that projecting teeth are in alignment with the circumferentially spaced apertures of the cylindrical portion of the guard means.

42. A pipe coupling according to claim 1, wherein a spacer is mounted between the sealing means and the pipe engaging means.

43. A pipe coupling according to claim 1, wherein the tubular body of the pipe coupling is manufactured from a group consisting of copper, plastic, brass and steel.

44. A pipe coupling comprising a tubular body having at least one open end, stop means disposed within the tubular body distal to the open end to stop a pipe when it is inserted a predetermined distance into the tubular body, sealing means intermediate the stop means and the open end, and a pipe engaging means having a variable diameter to clamp and release an inserted pipe as a result of the diameter of the pipe engaging means reducing and increasing respectively and a pipe release means, the pipe release means being movably mounted in the open end and having a pipe clamping position and a pipe release position, the pipe release means being movable between these two positions by an operator, guard means being movably mounted in the pipe coupling to cover the sealing means when the pipe is being inserted or removed and the guard means is formed by a cylindrical tube coaxial with and moveably mounted in the tubular body whereby the sealing means is protected from the pipe by the guard means when the pipe is being inserted or removed, wherein the open end of the tubular body has an internal surface and wherein the internal surface of the open end of the tubular body has moving means.

45. A pipe coupling according to claim 44, wherein the moving means on the internal surface of the open end of the tubular body is at least one protuberance projecting radially inwardly.

46. A pipe coupling comprising a tubular body having at least one open end, stop means disposed within the tubular body distal to the open end to stop a pipe when it is inserted a predetermined distance into the tubular body, sealing means intermediate the stop means and the open end, and a pipe engaging means having a variable diameter to clamp and release an inserted pipe as a result of the diameter of the pipe engaging means reducing and increasing respectively and a pipe release means, the pipe release means being movably mounted in the open end and having a pipe clamping position and a pipe release position, the pipe release means being movable between these two positions by an operator, guard means being movably mounted in the pipe coupling to cover the sealing means when the pipe is being inserted or removed and the guard means is formed by a cylindrical tube coaxial with and moveably mounted in the tubular body whereby the sealing means is protected from the pipe by the guard means when the pipe is being inserted or removed, wherein the pipe engaging means is a clamping o-ring having a plurality of substantially radially inwardly projecting teeth.

47. A pipe coupling according to claim 46, wherein all of the teeth extend in the same direction away from a plane perpendicular to the longitudinal axis of the tubular body.

48. A pipe coupling according to claim 47, wherein the teeth are angled away from the open end toward the stop.

49. A pipe coupling according to claim 46, wherein an abutment on the internal surface of the tubular body prevents the clamping o-ring moving in a direction towards the stop means.

50. A pipe coupling comprising a tubular body having at least one open end, stop means disposed within the tubular body distal to the open end to stop a pipe when it is inserted a predetermined distance into the tubular body, sealing means intermediate the stop means and the open end, and a pipe engaging means having a variable diameter to clamp and release an inserted pipe as a result of the diameter of the pipe engaging means reducing and increasing respectively and a pipe release means, the pipe release means being movably mounted in the open end and having a pipe clamping position and a pipe release position, the pipe release means being movable between these two positions by an operator, guard means being movably mounted in the pipe coupling to cover the sealing means when the pipe is being inserted or removed and the guard means is formed by a cylindrical tube coaxial with and moveably mounted in the tubular body whereby the sealing means is protected from the pipe by the guard means when the pipe is being inserted or removed, wherein an end of the pipe release means has means for engaging the guard means and the guard means has a corresponding engagement means for engagement with the pipe release means.

51. A pipe coupling according to claim 50, wherein the guard means comprises a circumferential ridge portion and a cylindrical portion extending therefrom having a plurality of apertures spaced apart from one another circumferentially in alignment with the pipe engaging means.

* * * * *